(12) United States Patent
Shawver et al.

(10) Patent No.: US 8,726,278 B1
(45) Date of Patent: *May 13, 2014

(54) METHODS AND SYSTEM FOR REGISTERING CALLBACKS AND DISTRIBUTING TASKS TO TECHNICAL COMPUTING WORKS

(75) Inventors: Matt Shawver, Brighton, MA (US); Jocelyn Luke Martin, Burwell (GB); Roy Lurie, Hopkinton, MA (US); Loren Dean, Natick, MA (US); Cleve Moler, West Newbury, MA (US); Eugene McGoldrick, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 1800 days.

This patent is subject to a terminal disclaimer.

(21) Appl. No.: 10/896,784

(22) Filed: Jul. 21, 2004

(51) Int. Cl.
  *G06F 9/46* (2006.01)
(52) U.S. Cl.
  USPC .......................................................... 718/100
(58) Field of Classification Search
  USPC .......................................................... 718/105
  See application file for complete search history.

(56) References Cited

U.S. PATENT DOCUMENTS

| | | | |
|---|---|---|---|
| 5,481,698 A | 1/1996 | Itoh et al. | |
| 5,490,097 A | 2/1996 | Swenson et al. | |
| 5,612,957 A | 3/1997 | Gregerson et al. | |
| 5,748,930 A | 5/1998 | Prakash | |
| 5,761,507 A * | 6/1998 | Govett | 718/101 |
| 5,784,884 A | 7/1998 | Poerio et al. | |
| 5,838,968 A | 11/1998 | Culbert | |
| 5,893,128 A | 4/1999 | Nauckhoff | |
| 5,926,775 A | 7/1999 | Brumley et al. | |
| 5,930,465 A | 7/1999 | Bellucco et al. | |
| 5,950,201 A | 9/1999 | Van Huben et al. | |
| 6,003,065 A | 12/1999 | Yan et al. | |
| 6,006,230 A | 12/1999 | Ludwig et al. | |
| 6,058,426 A | 5/2000 | Godwin et al. | |
| 6,112,243 A | 8/2000 | Downs et al. | |
| 6,115,642 A | 9/2000 | Brown et al. | |
| 6,173,322 B1 | 1/2001 | Hu | |
| 6,249,836 B1 | 6/2001 | Downs et al. | |

(Continued)

FOREIGN PATENT DOCUMENTS

EP 1283466 A1 2/2003

OTHER PUBLICATIONS

Husbands, Parry Jones Reginald, "Interactive Supercomputing," pp. 1-96 (1999).

(Continued)

*Primary Examiner* — Meng An
*Assistant Examiner* — Eric C Wai
(74) *Attorney, Agent, or Firm* — Harrity & Harrity, LLP

(57) ABSTRACT

A method and system is disclosed for providing a distributed technical computing environment for distributing technical computing tasks from a technical computing client to technical computing workers for execution of the tasks on one or more computers systems. Tasks can be defined on a technical computing client, and the tasks organized into jobs. The technical computing client can directly distribute tasks to one or more technical computing workers. Furthermore, the technical computing client can submit tasks, or jobs comprising tasks, to an automatic task distribution mechanism that distributes the tasks automatically to one or more technical computing workers providing technical computing services. The technical computing worker performs technical computing of tasks and the results of the execution of tasks may be provided to the technical computing client.

24 Claims, 22 Drawing Sheets

(56) References Cited

U.S. PATENT DOCUMENTS

| | | | |
|---|---|---|---|
| 6,463,457 B1 | 10/2002 | Armentrout et al. | |
| 6,895,338 B2 | 5/2005 | Hsiung et al. | |
| 6,950,874 B2 | 9/2005 | Chang et al. | |
| 7,093,004 B2 | 8/2006 | Bernardin et al. | |
| 7,117,500 B2 * | 10/2006 | Pulsipher et al. | 718/105 |
| 7,254,607 B2 | 8/2007 | Hubbard et al. | |
| 7,305,475 B2 * | 12/2007 | Tock | 709/227 |
| 7,376,693 B2 | 5/2008 | Neiman et al. | |
| 7,395,536 B2 | 7/2008 | Verbeke et al. | |
| 7,490,029 B2 | 2/2009 | Wasynczuk et al. | |
| 7,516,440 B2 * | 4/2009 | Upton | 717/106 |
| 7,886,296 B2 | 2/2011 | Ly et al. | |
| 2002/0004853 A1 | 1/2002 | Jones et al. | |
| 2002/0019844 A1 | 2/2002 | Kurowski et al. | |
| 2002/0087382 A1 | 7/2002 | Tiburcio | |
| 2002/0091752 A1 | 7/2002 | Firlie | |
| 2002/0161890 A1 | 10/2002 | Chen | |
| 2002/0186384 A1 | 12/2002 | Winston et al. | |
| 2003/0056018 A1 | 3/2003 | Pike et al. | |
| 2003/0084010 A1 | 5/2003 | Bigus et al. | |
| 2003/0125816 A1 | 7/2003 | Leduc et al. | |
| 2003/0154284 A1 | 8/2003 | Bernardin et al. | |
| 2004/0044909 A1 * | 3/2004 | Mirza et al. | 713/201 |
| 2004/0153545 A1 | 8/2004 | Pandya et al. | |
| 2004/0215590 A1 * | 10/2004 | Kroening | 707/1 |
| 2005/0015437 A1 * | 1/2005 | Strait | 709/203 |
| 2005/0021594 A1 | 1/2005 | Bernardin et al. | |
| 2005/0034130 A1 | 2/2005 | Skovira | |
| 2005/0052664 A1 | 3/2005 | Ferlitsch | |
| 2005/0283534 A1 | 12/2005 | Bigagli et al. | |
| 2005/0289274 A1 | 12/2005 | Ghercioiu et al. | |
| 2006/0048157 A1 * | 3/2006 | Dawson et al. | 718/104 |
| 2006/0053211 A1 | 3/2006 | Kornerup et al. | |

OTHER PUBLICATIONS

Berkenpas, Monica, "Current products available to perform distributed and/or parallel computing with MATLAB," (2003).
"Parallel Matlab survey" retrieved from the internet at: http://supertech.lcs.mit.edu/~cly/survey.html.
"Mathtools.net>MATLAB>Parallel" retrieved from internet at: http://www.mathtools.net/.
"gridMathematica, Technical Computing for the Grid," retrieved from the internet at: www.wolfram.com/gridmathematica.
"Plapack: Parallel Linear Algebra Package," retrieved from the internet at: http://www.cs.utexas.edu/users/plapack/.
"Matlab Parallelization toolkit," retrieved from the internet at: http://hem.passagen.se/einar_heiberg/index/html?k.
"DistributePP," retrieved from the internet at: http://www.mathworks.com/matlabcentral/fileexchange/loadFile.do?objectId=1287&objectType=file.
"Netsolve/GridSolve-2.0," retrieved from the internet at: http://icl.cs.utk.edu/netsolve/.
"The DP-Toolbox Home Page," retrieved from the internet at: http://www-at.e-technik.uni-rostock.de/rg_ac/dp/.
"Software Documentation:Cornell Multitask Toolbox for MATLAB," retrieved from the internet at: www.tc.cornell.edu/Services/Software/CMTM/overview.html.
"PMI" retrieved from the internet at: http://www.mathworks.com/matlabcentral/fileexchange/loadFile.do?objectID=219.
"MATLAB Parallelization Toolkit 1.20," retrieved from the internet at: http://www.mathworks.com/matlabcentral/fileexchange/loadFile.do?objectId=1227.
"MultiMATLAB: MATLAB on Multiple Processors," retrieved from the internet at: http://www.cs.cornell.edu/Info/People/Int/multimatlab.html.
"MATmarks: Shared Memory Programming with MATLAB," retrieved from the internet at: http://polaris.cs.uiuc.edu/matmarks/matmarks.html.
"Parallel Programming with MatlabMPI," retrieved from the internet at: http://arxiv.org/abs/astro-ph/0107406.
"Parallel Matlab: The Next Generation," retrieved from the internet at: http://www.astro.princeton.edu/~jvkepner/.
"Commsim and Multi Toolbox for MATLAB 5," retrieved from the internet at: http://www.lapsi.eletro.ufrgs.br/Disciplinas/ENG_ELETRICA/CAD-ENG/Matlab/CommSim/COMMSIM%20for%20MATLAB%205.htm.
"Matlab Parallelization Toolkit," retrieved from the internet at: http://www.imv.liu.se/klinfys/einar/misc.html.
"Paralize," retrieved from the internet at: http://www.mathworks.com/matlabcentral/files/211/content/paralize/paralize.html.
"Matpar: Parallel Extensions to MATLAB," retrieved from the internet at: http://www-hpc.jpl.nasa.gov/PS/MATPAR/.
"Falcon," retrieved from the internet at: http://www.csrd.uiuc.edu/falcon/falcon.html.
"AccelChip—MATLAB DSP Algorithmic Synthesis for FPGAs and ASICs," retrieved from the internet at: http://www.accelchip.com/.
"Menhir," retrieved from the internet at: http://www.irisa.fr/caps/PROJECTS/Menhir/menhir/orap/.
"Accelerating Matlab," retrieved from the internet at: http://research.microsoft.com/~minka/software/matlab.html.
"Parmatlab," retrieved from the internet at: http://www.mathworks.com/matlabcentral/fileexchange/loadFile.do?objectId=217&objectType=FILE.
"CONcurrent LABoratory," retrieved from the internet at: http://www.cs.umu.se/research/conlab/.
"Distributed Matlab toolbox," retrieved from the internet at: http://www.geocities.com/kyawtuns/tools/html?200522.
"SGI-Cray Origin2000 Supercomputer Repository," retrieved from the internet at: http://scv.bu.edu/SCV/Origin2000/matlab/MATLABexample.shtml.
"Parallel Programming with MatlabMPI," retrieved from the internet at: http://www.11.mit.edu/MatlabMPI/.
"Matlab Mesh Partitioning and Graph Separator Toolbox," retrieved from the internet at: http://www.cerfacs.fr/algor/Softs/MESHPART/.
"MPI Toolbox for Matlab (MPITB)," retrieved from the internet at: http://etcpc7.ugr.es/mpitb.php.
"RTExpress," retrieved from the internet at: http://www.rtexpress.com/.
"Parallel Programming with MPI," retrieved from the internet at: http://www.cs.usfca.edu/mpi/.
"PVM Toolbox for Matlab (PVMTB)," retrieved from the internet at: http://atc.ugr.es/javier-bin/pvmtb_eng.
"qsubfunc," retrieved from the internet at: http://www.sccn.ucsd.edu/~arno/qsubfunc.php.
"TMath 0.2: A Tcl Interface to MATLAB and Mathematica," retrieved from the internet at: http://ptolemy.eecs.berkeley.edu/other/tmath/tmath0.2/README.html.
Chen, Ying et al., "MATLAB*G: A Grid-Based Parallel MATLAB," retrieved online. (2004).
Czajkowski, Karl et al., "A Resource Management Architecture for Metacomputing Systems," Lecture Notes on Computer Science, pp. 62-82 (1998).
Gibson, Michael A. et al., "Efficient Exact Stochastic Simulation of Chemical Systems with Many Species and Many Channels," J. Phys. Chem. A., vol. 104:1876-1889 (2000).
Gillespie, Daniel T. et al., "Exact Stochastic Simulation of Coupled Chemical Reactions," The Journal of Physical Chemistry, vol. 81(25):2340-2361 (1977).
Kim, Young-Seok et al, "Design and Implementation of OGSI-Compliant Grid Broker Service," IEEE International Symposium on Cluster Computing and the Grid, pp. 754-761 (2004).
Konishi, Katsumi et al., "Performance Evaluation of Parallel Computing Tool for MATLAB on PC Grid Environment," Information Processing Society of Japan, Technical Report, vol. 2005(14):31-36 (2005).
Linda User's Guide & Reference Manual, Scientific Computing Associates, Manual Version 6.2, New Haven, CT, 164 pages (2000).
MacLaren, Jon, "Advance Reservations: State of the Art," retrieved online from: 12 pages, (2006).
MathWorks, "AU01—MATLAB for Automotive Data Analysis," Training Courses, North America Academic, 6 pages (2005).
MathWorks, "Product Page" 16 pages (2002).

(56) References Cited

OTHER PUBLICATIONS

Moler, Cleve, "Why there isn't a parallel MATLAB, Our experience has made us skeptical," retrieved online (1995).
Panyam, Jayanth et al., "Biodegradable nanoparticles for drug and gene delivery to cells and tissue," Advanced Drug Delivery Reviews, vol. 55:329-347 (2003).
Pawletta, S. et al., "A MATLAB Toolbox for Distributed and Parallel Processing," retrieved online (1995).
Petcu, Dana et al, "Extending Maple to the Grid: Design and Implementation," Parallel and Distributed Computing, 2004. Third International Symposium on/Algorithms, Models and Tools for Parallel Computing on Heterogeneous Networks, pp. 209-216 (2004).
Pezeshkpour, Farzad, "vfm," Matlab Central, 3 pages (2004).
Pound, G.E. et al, "A Grid-Enabled Problem Solving Environment (PSE) for Design Optimisation within Matlab," Parallel and Distributed Processing Symposium, pp. 50-57 (2003).
Shibata, Katsuhisa, "Improved and Added Functionalities of MATLAB Release 14," Interface, vol. 30:107-110 (2004).
The Mathworks, "Instrument Control Toolbox 1.2." Retrieved from Internet on Mar. 9, 2004.
The Mathworks, "MATLAB, The Language of Technical Computing, External Interfaces, Version 6," The Mathworks, Inc., (2002).
The Mathworks, "MATLAB, The Language of Technical Computing, Creating Graphical User Interfaces, Version 6," The Mathworks, Inc., (2002).
The Mathworks, "MATLAB, The Language of Technical Computing, External Interfaces Reference, Version 6," The Mathworks, Inc., (2002).
The Mathworks, "MATLAB, The Language of Technical Computing, Getting Started with MATLAB, Version 6," The Mathworks, Inc., (2002).
The Mathworks, "MATLAB, The Language of Technical Computing, Using MATLAB Graphics, Version 6," The Mathworks, Inc., (2002).
The Mathworks, "MATLAB Excel Builder, The Language of Technical Computing, User's Guide, Version 1," The Mathworks, Inc., (2002).
The Mathworks, "MATLAB Excel Builder 1.1 Release Notes," The Mathworks, Inc., (2002).
The Mathworks, "Data Acquisition Toolbox Adaptor Kit, for Use with MATLAB, User's Guide, Version 2," The Mathworks, Inc., (2002).
The Mathworks, "Data Acquisition Toolbox Quick Reference Guide," The Mathworks, Inc., (2002).
The Mathworks, "Data Acquisition Toolbox, for Use with MATLAB," User's Guide Version 2, The Mathworks, Inc., (2002).
The Mathworks, "MATLAB Link for Code Composer Studio Development Tools, User's Guide Version 1," The Mathworks, Inc., (2002).
The Mathworks, "MATLAB Link for Code Composer Studio Development Tools Release Notes," The Mathworks, Inc., (2002).
The Mathworks, "MATLAB Com Builder, The Language of Technical Computing, User's Guide Version 1," The Mathworks, Inc., (2002).
The Mathworks, "Communications Toolbox, for Use with MATLAB, User's Guide Version 2," The Mathworks, Inc., (2002).
The Mathworks, "MATLAB Com Builder Release Notes," The Mathworks, Inc., (2002).
The Mathworks, "Simulink, Model-Based and System-Based Design, Writing S-Functions Version 5," The Mathworks, Inc., (2002).
The Mathworks, "Simulink 5.0 Release Notes," The Mathworks, Inc., (2002).
The Mathworks, "Simulink, Model-Based and System-Based Design, Using Simulink Version 5," The Mathworks, Inc., Version 5 (2002).
The Mathworks, "Simulink, Model-Based and System-Based Design, Simulink Reference Version 5," The Mathworks, Inc., Version 5 (2002).
The Mathworks, "Simulink Performance Tools 1, for enhancing design productivity for your Simulink models."
The Mathworks, "Simulink Performance Tools 1, Manage and optimize the performance of large Simulink models," www.mathworks.com.
The Mathworks, "Simulink Performance Tools 1, Measure test completeness, accelerate and optimize model performance."
The Mathworks, "Simulink Performance Tools Release Notes," The Mathworks, Inc., (2002).
The Mathworks, "Stateflow and Stateflow Coder, for Complex Logic and State Diagram Modeling, User's Guide Version 5," The Mathworks, Inc., (2002).
The Mathworks, "Stateflow and Stateflow Coder Release Notes," The Mathworks, Inc., (2002).
The Mathworks, "MATLAB, The Language of Technical Computing, Installation Guide for Windows, Release 13 (MATLAB 6.5 Product Family," The Mathworks, Inc., (2002).
The Mathworks, "MATLAB, The Language of Technical Computing, Installation Guide for UNIX, Release 13 (MATLAB 6.5 Product Family," The Mathworks, Inc., (2002).
The Mathworks, "MATLAB, The Language of Technical Computing, Installing and Using MATLAB on Mac OS X, Release 13 (MATLAB 6.5 Product Family," The Mathworks, Inc., (2002).
The Mathworks, "MATLAB, The Language of Technical Computing, MAT-File Format Version 5," The Mathworks, Inc., (2002).
The Mathworks, "MATLAB, The Language of Technical Computing, Release 11 New Features," The Mathworks, Inc., (1999).
The Mathworks, "MATLAB, The Language of Technical Computing, Release 11.1 New Features," The Mathworks, Inc., (1999).
The Mathworks, "MATLAB, The Language of Technical Computing, MATLAB Programming Tips Version 6," The Mathworks, Inc., (2002).
The Mathworks, "MATLAB, The Language of Technical Computing, MATLAB Function Reference vol. 1: A-E Version 6," The Mathworks, Inc., (2002).
The Mathworks, "MATLAB, The Language of Technical Computing, MATLAB Function Reference vol. 2: F-O Version 6," The Mathworks, Inc., (2002).
The Mathworks, "MATLAB, The Language of Technical Computing, MATLAB Function Reference vol. 3: P-Z Version 6," The Mathworks, Inc., (2002).
The Mathworks, "MATLAB, The Language of Technical Computing, Release Notes for Release 13," The Mathworks, Inc., (2002).
The Mathworks, "MATLAB, The Language of Technical Computing, MATLAB 6.5 Release Notes," The Mathworks, Inc., (2002).
The Mathworks, "Optimization Toolbox, for Use with MATLAB, User's Guide Version 2," The Mathworks, Inc, (2001).
The Mathworks, "Optimization Toolbox 2.2 Release Notes," The Mathworks, Inc., (2001).
The Mathworks, "SimMechanics, For Use with Simulink, User's Guide Version 1," The Mathworks, Inc., (2002).
The Mathworks, "SimMechanics Release Notes," The Mathworks, Inc., (2002).
The Mathworks, "MATLAB, The Language of Technical Computing, Using MATLAB Version 6," The Mathworks, Inc., (2002).
The Mathworks, "Communications Toolbox 2.1 Release Notes," The Mathworks, Inc, (2002).
The Mathworks, Inc., "The Optimization Toolbox 2.0, for use with MATLAB," 4 pages.
The Mathworks, "Data Acquisition Toolbox 2.2." Retrieved from Internet on Mar. 9, 2004.
Trefethen, Anne E. et al., "MultiMATLAB: MATLAB on Multiple Processors," retrieved online.
Webb, Peter, "Internet-Enabled Data Analysis and Visualization with MATLAB," retrieved online, 4 pages (2002).
Wright, Howard, "How to pause Matlab for less than one second?" Matlab Central, 9 pages (1999).
Xue, Gang et al, "Implementation of a Grid Computation Toolkit for Design Optimisation with Matlab and Condor," EURO-PAR 2003 Parallel Processing Lecture Notes in Computer Science, pp. 357-365 (2004).
European Office Action for Application No. 06734338.4, 9 pages, dated Mar. 20, 2009.
European Office Action for Application No. 06845243.2, 5 pages, dated Apr. 24, 2009.

(56) References Cited

OTHER PUBLICATIONS

European Office Action for Application No. 06845243.2, 6 pages, dated Mar. 3, 2011.
European Summons to Attend Oral Proceedings Pursuant to RUle 115(1) EPC for Application No. 06734338.4, 11 pages, dated Nov. 23, 2011.
International Search Report for Application No. PCT/US2006/047302, 5 pages, dated Aug. 9, 2007.
International Search Report for Application No. PCT/US2006/003923, 4 pages, dated Jul. 13, 2006.
Invitation to Pay Additional Fees for Application No. PCT/US2006/047302, 10 pages, dated Apr. 10, 2007.
Japanese Office Action for Application No. 2008-545725, 8 pages, dated Sep. 25, 2012.
Japanese Office Action for Application No. 2008-545725, 6 pages, dated Jun. 28, 2011.
Japanese Office Action for Application No. 2007-556166, 5 pages, dated Jun. 12, 2012.
Japanese Office Action for Application No. 2007-556166, 2 pages, drafted Mar. 17, 2011.

* cited by examiner

METHODS AND SYSTEM FOR REGISTERING CALLBACKS AND DISTRIBUTING TASKS TO TECHNICAL COMPUTING WORKS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention generally relates to technical computing, and, more particularly, distributing technical computing processing to multiple computers in a network in a distributed technical computing environment.

BACKGROUND INFORMATION

MATLAB® is a product of The MathWorks, Inc. of Natick, Mass., which provides engineers, scientists, mathematicians, and educators across a diverse range of industries with an environment for technical computing applications. MATLAB® is an intuitive high performance language and technical computing environment that provides mathematical and graphical tools for mathematical computation, data analysis, visualization and algorithm development. MATLAB® integrates numerical analysis, matrix computation, signal processing, and graphics in an easy-to-use environment where problems and solutions are expressed in familiar mathematical notation, without traditional programming. MATLAB® is used to solve complex engineering and scientific problems by developing mathematical models that simulate the problem. A model is prototyped, tested and analyzed by running the model under multiple boundary conditions, data parameters, or just a number of initial guesses. In MATLAB®, one can easily modify the model, plot a new variable or reformulate the problem in a rapid interactive fashion that is typically not feasible in a non-interpreted programming such as Fortran or C.

As a desktop application, MATLAB® allows scientists and engineers to interactively perform complex analysis and modeling in their familiar workstation environment. However, a single workstation can be limiting to the size of the problem that can be solved, because of the relationship of the computing power of the workstation to the computing power necessary to execute computing intensive iterative processing of complex problems in a reasonable time. For example, a simulation of a large complex aircraft model may take a reasonable time to run with a single computation with a specified set of parameters. However, the analysis of the problem may also require the model be computed multiple times with a different set of parameters, e.g., at one-hundred different altitude levels and fifty different aircraft weights, to understand the behavior of the model under varied conditions. This would require five-thousand computations to analyze the problem as desired and the single computer would take an unreasonable or undesirable amount of time to perform these simulations. In this case, the single computer would be allocated full-time to performing the computation while many computer resources on the network may be idle. Additionally, the benefit of the interactive features of the software is reduced as the computation time increases.

With many engineering and scientific problems requiring larger and more complex modeling, computations accordingly become more resource intensive and time-consuming. When a computation becomes so large and complex that it cannot be completed in a reasonable amount of time on a single computer, a solution to decrease the computation time is needed.

SUMMARY OF THE INVENTION

The present invention provides methods and a system for dynamically distributing technical computing tasks in a distributed technical computing environment. A technical computing client may define a job comprising one or more tasks. The technical computing client can distribute these tasks to technical computing workers for technical computing of the task. The technical computing workers perform technical computing of the task and may provide a result of the task for the technical computing client. As such, the present invention allows the use of multiple computing resources on a network to perform technical computing of tasks to facilitate decreasing the computation time.

In one aspect, the invention relates to methods and mediums for distributing the processing of tasks in a distributed technical computing environment. The method submits, by a technical computing client, a first task to an automatic task distribution mechanism. The automatic task distribution mechanism makes the first task available to a technical computing worker. The first task is associated with a function to be performed in a technical computing environment. The method also provides, by the automatic task distribution mechanism, the first task to a first technical computing worker taking an action to perform technical computing on the first task. The first technical computing worker has a technical computing environment for performing technical computing of tasks.

In another aspect of the invention, the automatic task distribution mechanism is an object exchange repository. In another aspect, the method submits to the automatic task distribution mechanism, by the first technical computing worker, a result of the first task. The result of the first task is associated with taking an action to perform technical computing on the first task.

In another aspect of the invention, the technical client obtains the result of the first task from the automatic task distribution mechanism. In one aspect of the invention, the method provides by a technical computing client a job to a job manager. The job is associated with one or more tasks. The first task of the one or more tasks has a function to perform by a technical computing environment.

In another aspect, the method further comprises submitting, by the job manager, the first task to an automatic task distribution mechanism. Furthermore, the automatic task distribution makes the first task available to a technical computing worker. In yet another aspect, the method further provides, by the job manager, the result of the first task to the technical computing client.

In another aspect, the invention relates to a method for distributing the processing of tasks in an object-oriented technical computing environment. The method provides, by a technical computing client, a first task object to distribute to a technical computing worker. The first task object defines a function to perform in a technical computing environment. The method further includes distributing the first task object to a first technical computing worker to take an action to perform technical computing on the function defined by the first task object.

In one aspect, the method further comprises providing, by the first technical computing worker, a first result object associated with the first task object. The first result object defines a result associated with taking an action to perform technical computing on the function defined by the first task object. In another aspect, the method further obtains, by the technical computing client, the first result object.

In another aspect, the invention relates to a method of distributing the processing of tasks in an object-oriented technical computing environment. The method provides, by a technical computing client, a first job object to a first job manager. The first job object is associated with one or more task objects. A first task object of the one or more task objects defines a function to perform in a technical computing environment. The method further submits, by the first job manager, the first task object to an automatic task distribution mechanism. The automatic task distribution mechanism makes the first task object available to a technical computing worker.

In one aspect of the invention, the automatic task distribution mechanism comprises an object exchange repository. In another aspect, the method further comprises providing, by a first technical computing worker, a first result object to the automatic task distribution mechanism. The first result object defines a result associated with taking an action to perform technical computing on the function defined by the first task object. In yet another aspect, the method obtains, by the first job manager, the first result object from the automatic task distribution mechanism. The first result object is associated with the first job.

In one aspect, the invention relates to a system for distributing tasks in a distributed technical computing environment. The system comprises a technical computing client submitting a first task to distribute for processing in a technical computing environment. The first task comprises at least one operation to perform by a technical computing environment. The system further comprises an automatic task distribution mechanism in communication with the technical computing client. The automatic task distribution mechanism receives the first task submitted by the technical computing client and makes the first task available to a technical computing worker. The system further comprises a first technical computing worker in communication with the automatic task distribution mechanism. The technical computing worker has a technical computing environment for performing technical computing of a task. The technical computing worker takes the first task from the automatic task distribution mechanism to perform technical computing on the first task.

In one aspect of the invention, the automatic task distribution mechanism comprises an object exchange repository. In another aspect, the system submits, to the automatic task distribution mechanism, by the first technical computing worker, a first result of the first task. The first result is associated with taking an action to perform technical computing on the first task. In another aspect, the system further obtains, by the technical computing client, the first result of the first task from the automatic task distribution mechanism.

In another aspect of the invention, the system further comprises a first job manager in communication with the automatic task distribution mechanism. The first job manager is also in communication with the technical computing client to receive a first job submitted by the technical computing client. The first job comprises one or more tasks, and a first job task from the one or more tasks comprises an operation to perform in a technical computing environment.

In another aspect, the system further comprises the first job manager submitting the first job task to the automatic task distribution mechanism. In another aspect, the first technical computing worker provides a result to the automatic distribution mechanism. The result is associated with taking an action to perform technical computing on the operation of the first job task. In yet another aspect, the first job manager obtains the result of the first job task from the automatic task distribution mechanism, and the result is associated with the first job.

The details of various embodiments of the invention are set forth in the accompanying drawings and the description below. Other features and advantages of the invention will become apparent from the description, the drawings and the claims.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Figure 1A:
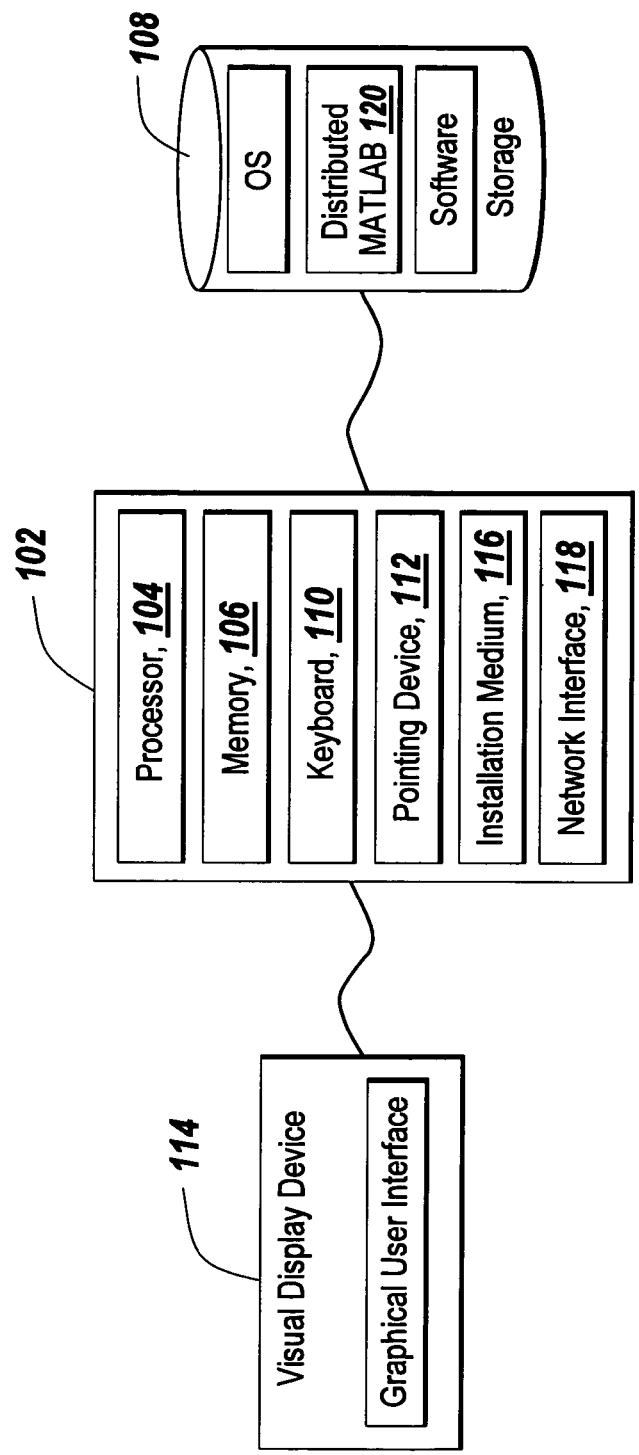
FIG. 1A is a block diagram of a computing device for practicing an embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides for dynamic distribution of technical computing tasks from a technical computing client to remote technical computing workers for execution of the tasks on multiple computers systems. Tasks can be declared on a technical computing client and additionally organized into jobs. A job is a logical unit of activities, or tasks that are processed and/or managed collectively. A task defines a technical computing command, such as a MATLAB® command, to be executed, and the number of arguments and any input data to the arguments. A job is a group of one or more tasks. The task can be directly distributed by the technical computing client to one or more technical computing workers. A technical computing worker performs technical computing on a task and may return a result to the technical computing client.

Additionally, a task or a group of tasks, in a job, can be submitted to an automatic task distribution mechanism to distribute the one or more tasks automatically to one or more technical computing workers providing technical computing services. The technical computing client does not need to specify or have knowledge of the technical computing workers in order for the task to be distributed to and computed by a technical computing worker. The automatic task distribution mechanism can distribute tasks to technical computing workers that are anonymous to any technical computing clients. The technical computing workers perform the task and may return as a result the output data generated from the execution of the task. The result may be returned to the automatic task distribution mechanism, which, in turn, may provide the result to the technical computing client.

Furthermore, the illustrative embodiment provides for an object-oriented interface in a technical computing environment to dynamically distribute tasks or jobs directly or indirectly, via the automatic task distribution mechanism, to one or more technical computing workers. The object-oriented interface provides a programming interface for a technical computing client to distribute tasks for processing by technical computer workers.

The illustrative embodiment will be described solely for illustrative purposes relative to a distributed MATLAB® technical computing environment. Although the illustrative embodiment will be described relative to a distributed MATLAB®-based application, one of ordinary skill in the art will appreciate that the present invention may be applied to distributing the processing of technical computing tasks with other technical computing environments, such as technical computing environments using software products of LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc.

FIG. 1A depicts an environment suitable for practicing an illustrative embodiment of the present invention. The environment includes a computing device 102 having memory 106, on which software according to one embodiment of the present invention may be stored, a processor (CPU) 104 for executing software stored in the memory 106, and other programs for controlling system hardware. The memory 106 may comprise a computer system memory or random access memory such as DRAM, SRAM, EDO RAM, etc. The memory 106 may comprise other types of memory as well, or combinations thereof. A human user may interact with the computing device 102 through a visual display device 114 such as a computer monitor, which may include a graphical user interface (GUI). The computing device 102 may include other I/O devices such a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals. The computing device 102 may support any suitable installation medium 116, a CD-ROM, floppy disks, tape device, USB device, hard-drive or any other device suitable for installing software programs such as Distributed MATLAB® 120. The computing device 102 may further comprise a storage device 108, such as a hard-drive or CD-ROM, for storing an operating system and other related software, and for storing application software programs such as Distributed MATLAB® 120 of the present invention. Additionally, the operating system and Distributed MATLAB® $^{120}$ of the present invention can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 118 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

Figure 1B:
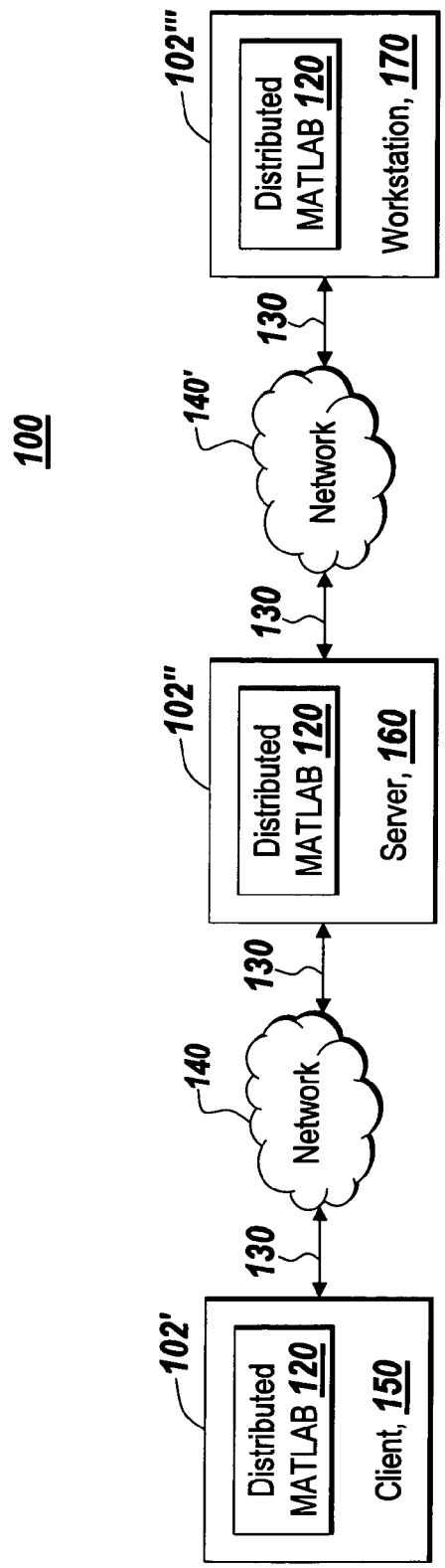
FIG. 1B is a block diagram of a distributed computing system for practicing an illustrative embodiment of the present invention.

FIG. 1A depicts Distributed MATLAB® 120 of the present invention running in a stand-alone system configuration of a single computing device 102. FIG. 1B depicts another environment suitable for practicing an illustrative embodiment of the present invention, where functionality of Distributed MATLAB® 120 is distributed across multiple computing devices (102', 102'' and 102'''). In a broad overview, the system 100 depicts a multiple-tier or n-tier networked computer system for performing distributed software applications such as the distributed technical computing environment of the present invention. The system 100 includes a client 150 (e.g., a first computing device 102') in communications through a network communication channel 130 with a server computer 160, also known as a server, (e.g., a second computing device 102") over a network 140 and the server in communications through a network communications channel 130 with a workstation (e.g., a third computing device 102''') over the network 140'. The client 150, the server 160, and the workstation 170 can be connected 130 to the networks 140 and/or 140' through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Each of the client 150, server 160 and workstation 170 can be any type of computing device (102', 102" and 102''') as described above and respectively configured to be capable of computing and communicating the operations described herein.

In one embodiment, each of the client 150, server 160 and workstation 170 are configured to and capable of running at least a portion of the present invention of Distributed MATLAB® 120. As a distributed software application, Distributed MATLAB® has one or more software components that run on each of the client 150, server 160 and workstation 170, respectively, and work in communication and in collaboration with each other to meet the functionality of the overall application. For example, the client 150 may hold a graphical modeling environment that is capable of specifying block diagram models and technical computing tasks to analyze the model. The client 150 may have software components configured to and capable of submitting the tasks to the server 160. The server 160 may have software components configured to and capable of receiving the tasks submitted by the client 150 and for determining a workstation 170 to assign the task for technical computing. The workstation 170 may hold software components capable of providing a technical computing environment to perform technical computing of the tasks assigned from the server 160 and submitted by the client 150. In summary, the technical computing environment and software components of the Distributed MATLAB® 120 application may be deployed across one or more different computing devices in various network topologies and configurations.

Figure 2A:
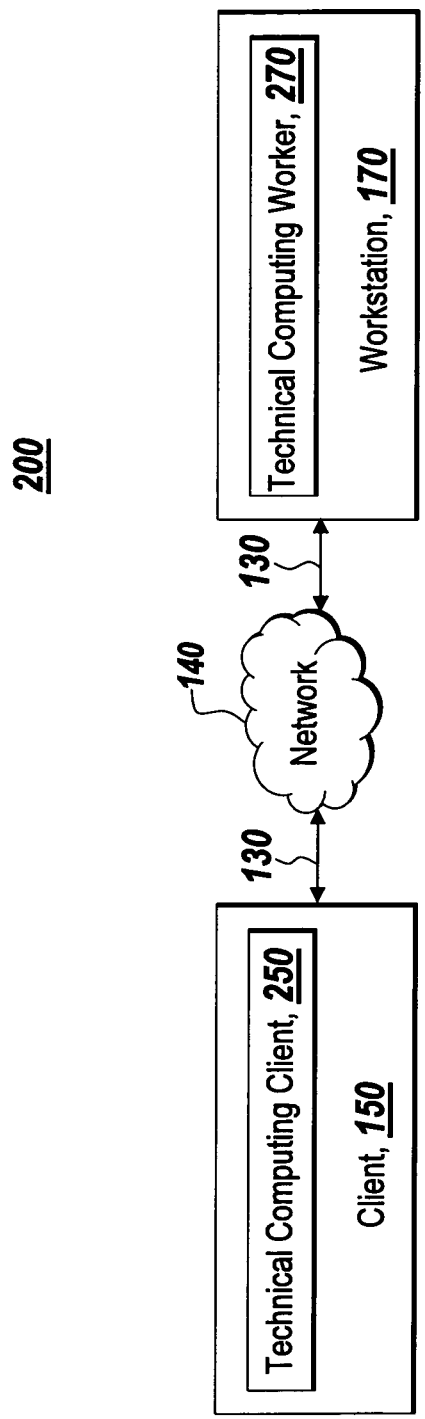
FIG. 2A is a block diagram of the components of an embodiment of the present invention in a two-node networked computer system.

FIG. 2A depicts an illustrative embodiment of the components of Distributed MATLAB® 120. In brief overview, the system 200 of Distributed MATLAB® 120 is a two-node distributed system comprising a technical computing client application 250, or technical computing client, running on a client 150 computer and a technical computing worker application 270, or technical computing worker, running on a workstation 170. The technical computing client 250 is in communications with the technical computing worker 170 through a network communications channel 130 over a network 140.

The technical computing client 250 can be a technical computing software application that provides a technical computing and graphical modeling environment for generating block diagram models and to define mathematical algorithms for simulating models. The technical computing client 250 can be a Distributed MATLAB® client, which may include all or a portion of the functionality provided by the standalone desktop application of MATLAB®. Additionally, the technical computing client 250 can be any of the software programs available in the MATLAB® product family. Furthermore, the technical computing client 250 can be a custom software program or other software that accesses Distributed MATLAB® functionality via an interface, such as an application programming interface, or by other means. One ordinarily skilled in the art will appreciate the various combinations of client types that may access the functionality of the system.

With an application programming interface and/or programming language of the technical computing client 250, functions can be defined representing a technical computing task to be executed by either a technical computing environment local to the client computer 150, or remote on the workstation 270. The local technical computing environment may be part of the technical computing client 250, or a technical computing worker running on the client computer 150. The programming language includes mechanisms, described below in more detail, to define a task to be distributed to a technical computing environment and to communicate the task to the technical computing worker 270 on the workstation 170, or alternatively, on the client 150. For example, the technical computing client 250 may declare a function to generate a random set of ten numbers and further delegate that the technical computing worker 270 running on the workstation 170 execute the function. Also, the application programming interface and programming language of the Distributed MATLAB® client 250 includes mechanisms, described in more detail below, to receive a result from the execution of technical computing of the task from another technical computing environment. For example, the technical computing client 250 may declare a variable to hold a result returned from the technical computing worker 270 performing technical computing of the random generation function.

The distributed functionality features of the programming languages of Distributed MATLAB® client 250 allows the technical computing client 250 to use the computing resources that may be available from a technical computing worker 270 on the workstation 170 to perform technical computing of the task. This frees up the technical computing client 250 to perform other tasks, or the client computer 150 to execute other software applications.

The technical computing worker 270 of the system 200 can be a technical computing software application that provides a technical computing environment for performing technical computing of tasks, such as those tasks defined or created by the technical computing client 250. The technical computing worker 270 can be a Distributed MATLAB® worker application, module, service, software component, or a session, which includes support for technical computing of functions defined in the programming language of MATLAB®. A session is an instance of a running technical computing worker 270 by which a technical computing client can connect and access its functionality. The technical computing worker 270 can include all the functionality and software components of the technical computing client 250, or it can just include those software components it may need to perform technical computing of tasks it receives for execution. The technical computing worker 270 may be configured to and capable of running any of the modules, libraries or software components of the MATLAB® product family. As such, the technical computing worker 270 may have all or a portion of the software components of MATLAB® installed on the workstation 170, or alternatively, accessible on another system in the network 140. The technical computing worker 270 has mechanisms, described in detail later, to receive a task distributed from the technical computing client 250. The technical computing worker 270 is capable of performing technical computing of the task as if the technical computing client 250 was performing the technical computing in its own technical computing environment. The technical computing worker 270 also has mechanisms, to return a result generated by the technical computing of the task to the technical computing client 250.

The technical computing worker 270 can be available on an as needed basis to the technical computing client 250. When not performing technical computing of tasks from the technical computing client 250, the workstation 170 of the technical computing worker 270 can be executing other software programs, or the technical computing worker 270 can perform technical computing of tasks from other technical computing clients.

Figure 2B:
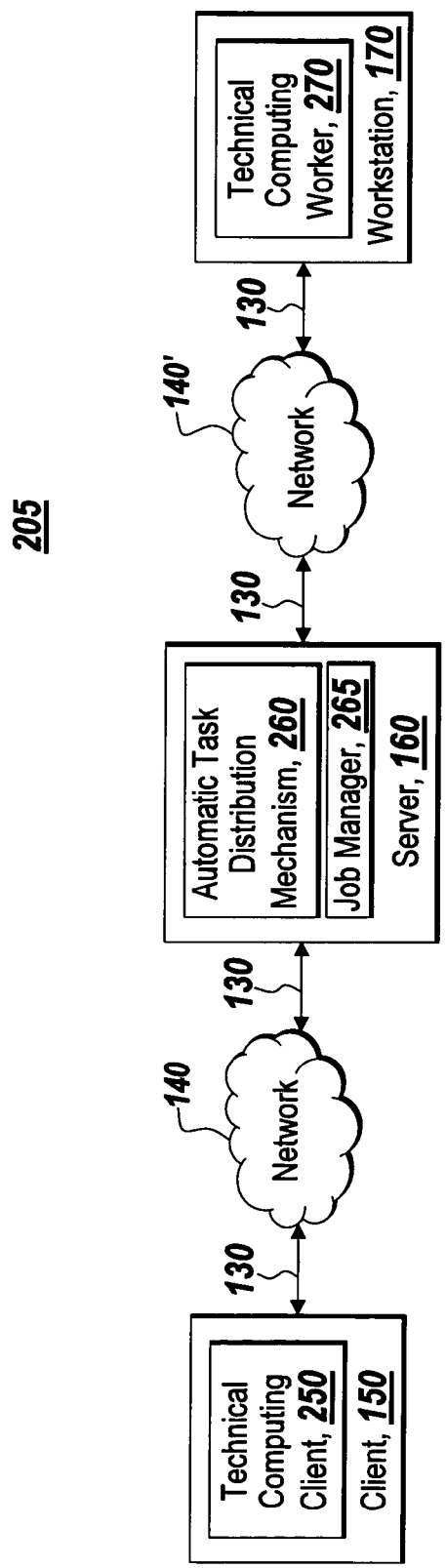
FIG. 2B is a block diagram of the components of an alternative embodiment of the present invention in a multi-tier networked computer system.

FIG. 2B shows another illustrative embodiment of the Distributed MATLAB® system of the present invention in a multi-tier distributed computer system as depicted in FIG. 2B. The multi-tier distributed system 205 includes a technical computing client 250 running on a client computer 150 in communications over a network communication channel 130 to a server 160 on a network 140. The server 160 comprises an automatic task distribution mechanism 260 and a job manager 265. The job manager 265 interfaces with the automatic task distribution mechanism 260 on the server 160. The automatic task distribution mechanism 260 communicates over a network communication channel 130 on the network 140 to the technical computing worker 270 on the workstation 170.

The automatic task distribution mechanism 260 comprises one or more application software components to provide for the automatic distribution of tasks from the technical computing client 250 to the technical computing worker 270. The automatic task distribution mechanism 260 allows the technical computing client 250 to delegate the management of task distribution to the automatic task distribution mechanism 260. For example, with the programming language of Distributed MATLAB®, a task can be defined and submitted to the automatic task distribution mechanism 260 without specifying which technical computing worker 270 is to perform the technical computing of the task. The technical computing client 250 does not need to know the specifics of the technical computing worker 270. The technical computing client can define a function to submit the task to the automatic task distribution mechanism 260, and get a result of the task from the automatic task distribution mechanism 260. As such, the automatic task distribution mechanism provides a level of indirection between the technical computing client 250 and the technical computing worker 270.

This eases the distributed programming and integration burden on the technical computing client 250. The technical computing client 250 does not need to have prior knowledge of the availability of the technical computing worker 270. For multiple task submissions from the technical computing client 250, the automatic task distribution mechanism 260 can manage and handle the delegations of the tasks to the same technical computing worker 270, or to other technical computing workers, e.g., 270 and 270', and hold the results of the tasks on behalf of the technical computing client 250 for retrieval after the completion of technical computing of all the distributed tasks.

As part of the software components of Distributed MATLAB®, a job manager module 265, or "job manager", is included as an interface to the task and result management functionality of the automatic task distribution mechanism 260. The job manager 265 can comprise an object-oriented interface to provide control of delegating tasks and obtaining results in the multi-tiered distributed system 205. The job manager 265 provides a level of programming and integration abstraction above the details of inter-process communications and workflow between the automatic task distribution mechanism 260 and the technical computing worker 270. The job manager 265 also provides an interface for managing a group of tasks collectively as a single unit called a job, and on behalf of a technical computing client 250, submitting those tasks making up the job, and obtaining the results of each of the tasks until the job is completed. Alternatively, the automatic task distribution mechanism 260 can include the functionality and object-oriented interface of the job manager 265, or the automatic task distribution mechanism 260 and the job manager 265 can be combined into a single application, or software component. In an exemplary embodiment, the job manager 265 comprises both the functionality of the job manager 265 and the automatic task distribution mechanism 260. One ordinarily skilled in the art will recognize the functions and operations of the job manager 265 and the automatic task distribution mechanism 260 can be combined in various software components, applications and interfaces.

Figure 2C:
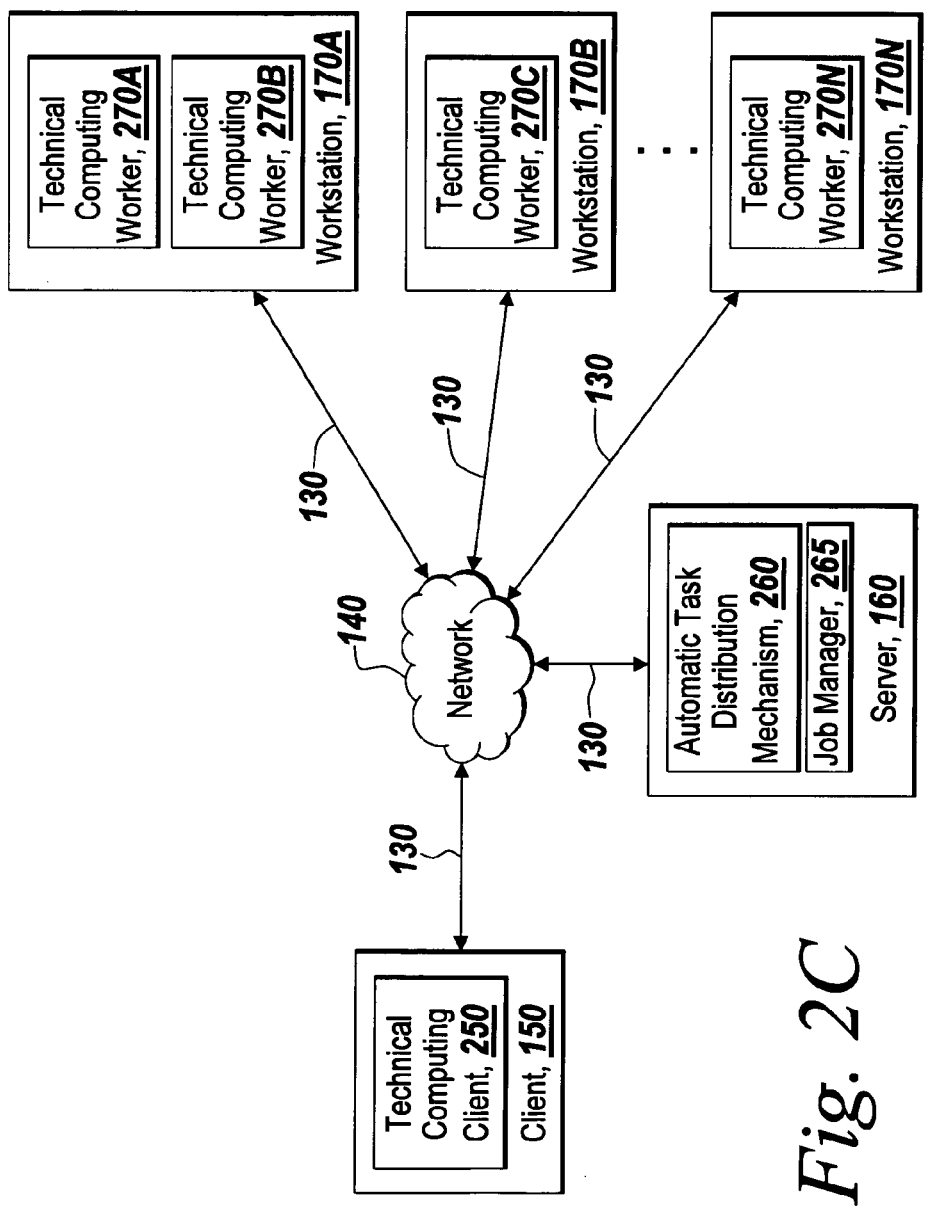
FIG. 2C is a block diagram of the components of an exemplary embodiment of the present invention in a distributed network computer system.

Referring now to FIG. 2C, an exemplary embodiment of the present invention is shown with multiple technical computing workers 270A-270N hosted on a plurality of workstations 170A-170N. The technical computing client 250 may be in communication through the network communication channel 130 on the network 140 with one, some or all of the technical computing workers 270A-270N. In a similar manner, the automatic task distribution mechanism 260 may be in communication through the network communication channel 130 on the network 140 with one, some or all of the technical computing workers 270A-270N. As such, the technical computing client 250 and/or the automatic task distribution mechanism 260 can distribute tasks to multiple technical computing workers 270A-270N to scale the distributed system and increase computation time of tasks. As also shown in FIG. 2C, the technical computing workers 270A-270B can be hosted on the same workstation 170A, or a single technical computing worker 270C can have a dedicated workstation 170B. Alternatively, one or more of the technical computing workers 270A-270N can be hosted on either the client 150 or the server 160.

The computing devices (102, 102', 102", 102''') depicted in FIGS. 1A and 1B can be running any operating system such as any of the versions of the Microsoft® Windows operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. Furthermore, the software components of Distributed MATLAB® can be capable of and configured to operate on the operating system that may be running on any of the computing device (e.g., 102, 102', 102", 102'''). Additionally, each of the client 150, the server 160 and the workstation 170 can be running the same or different operating systems. For example, the client 150 can running Microsoft® Windows, the server 160 can be running a version of Unix, and the workstation a version of Linux. Or each of the client 150, the server 160 and the workstation 170 can be running Microsoft® Windows. Additionally, the software components of Distributed MATLAB® can be capable of and configured to operate on and take advantage of different processors of any of the computing device (e.g., 102, 102', 102", 102'''). For example, Distributed MATLAB® can run on a 32 bit processor of one computing device 102 and a 64 bit processor of another computing device 102'. In a distributed system, such as the system depicted in FIG. 1B, Distributed MATLAB® can operate on computing devices (102, 102', 102", 102''') that can be running on different processor architectures in addition to different operating systems. One ordinarily skilled in the art will recognize the various combinations of operating systems and processors that can be running on any of the computing devices (102, 102', 102", and 102''').

Although the present invention is discussed above in terms of distributing software components of Distributed MATLAB® across the computing devices of a client 150, server 160 and workstation 170, any other system and/or deployment architecture that combines and/or distributes one or more of the technical computing client 250, job manager 265, automatic task distribution mechanism 260 and technical computing worker 270 across any other computing devices and operating systems available in the network 140 may be used. Alternatively, all the software components of Distributed MATLAB® can run on a single computing device 102, such as the client 150, server 160 or the workstation 170.

Figure 3A:
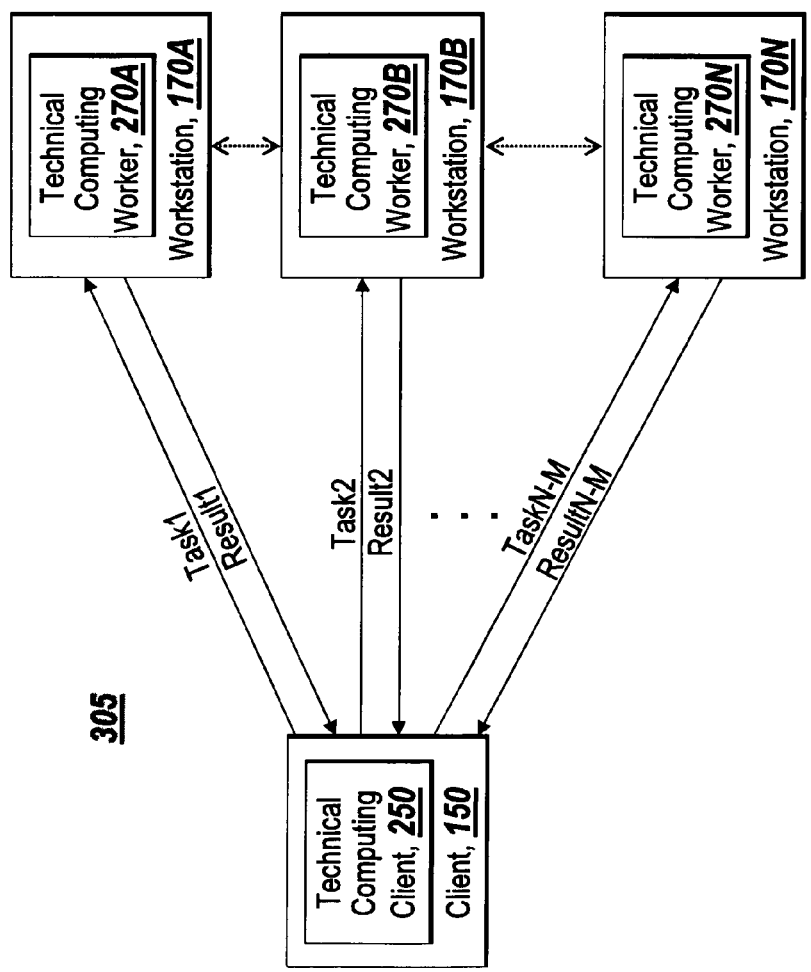
FIG. 3A is a block diagram of the direct distribution mode of operation of the present invention.
Figure 3B:
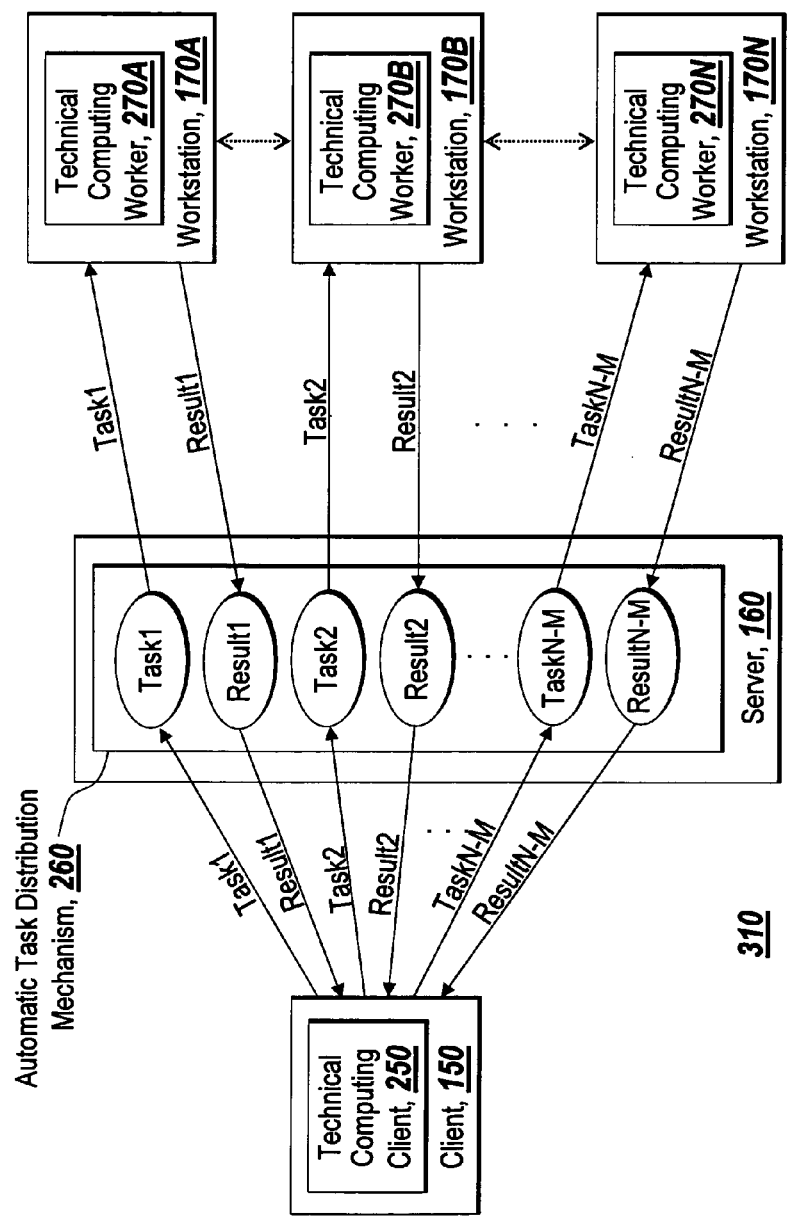
FIG. 3B is a block diagram of the automatic distribution mode of operation of the present invention.
Figure 3C:
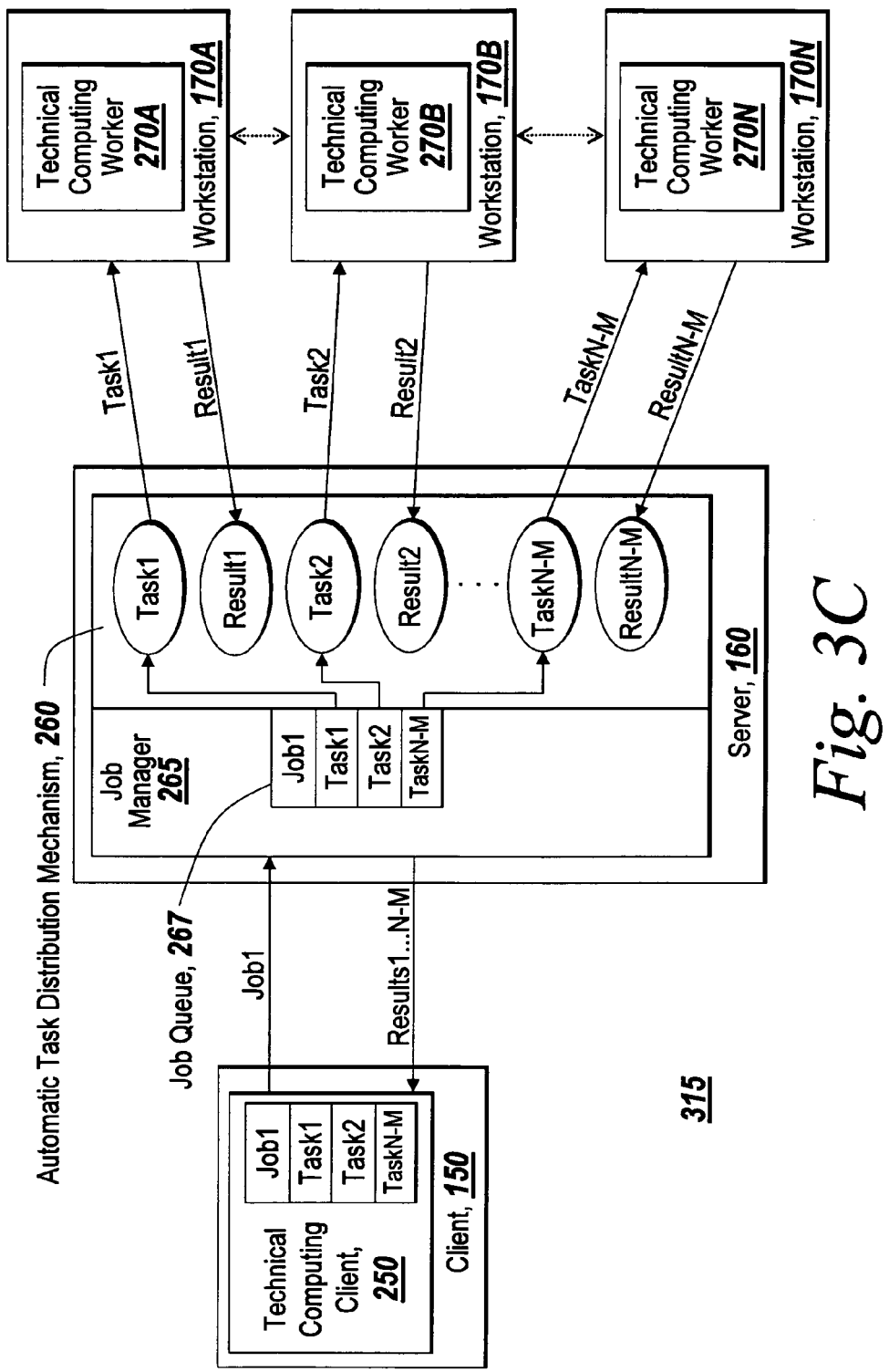
FIG. 3C is a block diagram of the batch automatic distribution mode of operation of the present invention.
Figure 3D:
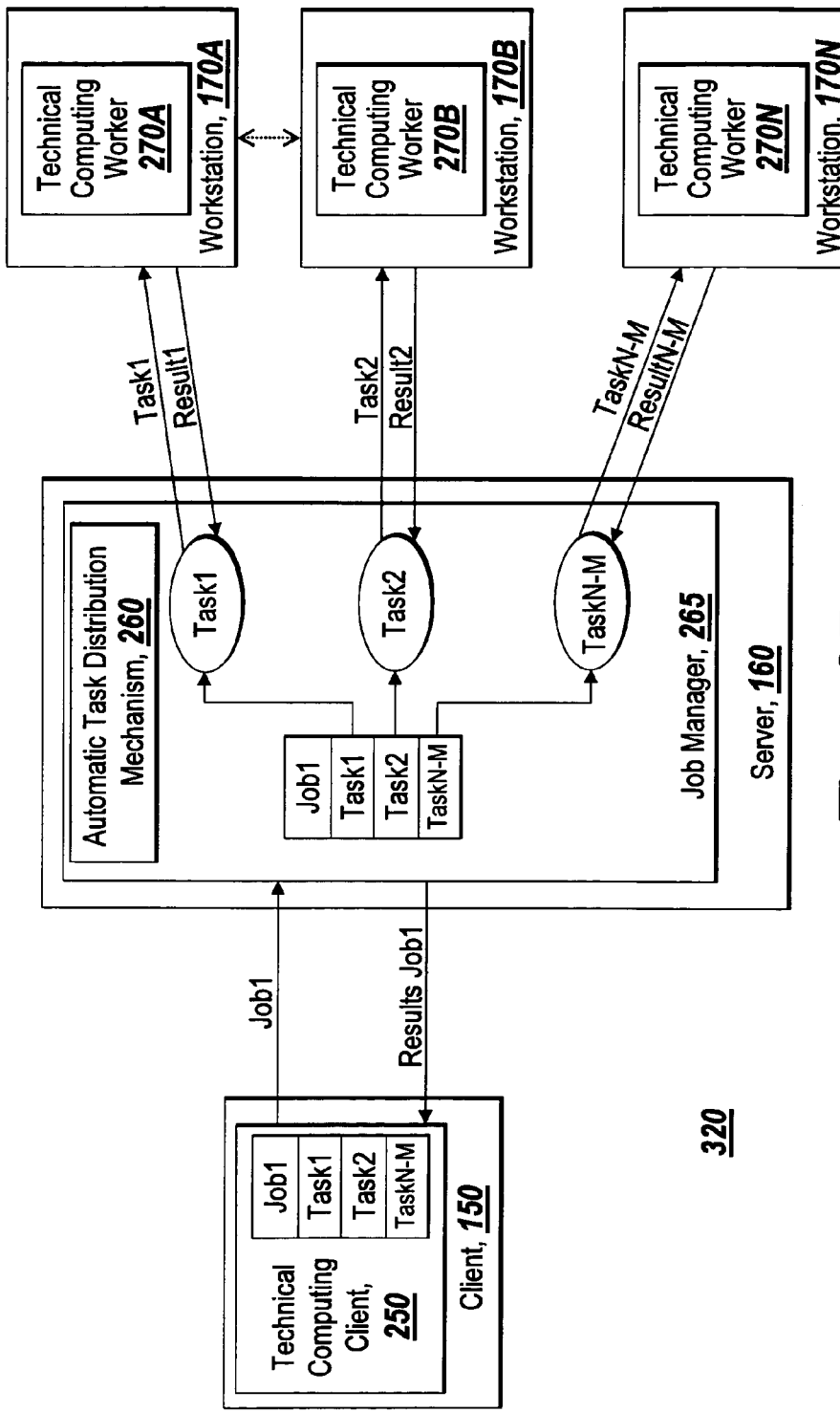
FIG. 3D is a block diagram of an exemplary embodiment of the batch automatic distribution mode of operation of the present invention.

Distributed MATLAB® of the present invention provides flexibility in methods of task distribution with multiple modes of operation. In FIGS. 3A, 3B and 3C, three modes of task distribution of Distributed MATLAB® are shown. FIG. 3A depicts a direct distribution mode, FIG. 3B, an automated distribution mode and FIG. 3C, a batch mode of automated distribution. Additionally, FIG. 3D depicts an exemplary embodiment of the batch mode of automated distribution.

The direct distribution system 305 of FIG. 3A is intended for those users who desire a high level of control over which technical computing worker 270A-270N executes a particular task. In brief overview of the direct distribution system 305, the technical computing client 250 is in communications with a plurality of technical computing workers, 270A-270N, each running on their own workstation 170A-170N. In an alternative embodiment, one or more of these technical computing workers 270A-270N can be running on the same computing device, e.g., workstation 270A, or on the client 150 or the server 160. This direct distribution system 305 allows a task to be sent to a particular technical computing worker, e.g., technical computing worker 270A of a plurality of technical computing workers 270A-270N. Then, the technical computing client 250 can continue with other work while the specified technical computing worker, e.g., technical computing worker 270A, is performing technical computing of the submitted task. Some time after submitting the task to the technical computing worker 270A, the technical computing client 250 can then obtain the result of the task from the technical computing worker 270A. Furthermore, each technical computing worker 270N can process multiple tasks, e.g., TaskN-M, and for each task produce a result, e.g., ResultN-M. Alternatively, the technical computing worker 270A may perform technical computing of a task without returning a result, or may return information acknowledging completion of the task. This mode of task distribution is useful for a computer network with a relatively small number of known workstations 170A-170N and technical computing workers 270A-270N. A task can be delegated to a specified technical computing worker running 270A on a workstation 170A that has a higher speed configuration than the other workstations 170B-170N. For example, a longer task could be executed on such a workstation 170A in order to speed the overall computation time.

As further depicted in FIG. 3A, the technical computing client 250 of the direct distribution system 305 can submit multiple tasks (e.g., TaskN-M) to each of the multiple technical computing workers 270A-270N. For example, the technical computing client 250 submits task 1 to technical computing worker 270A, submits task 2 to technical computing worker 270B, and submits task N to technical computing worker 270N. The technical computing client 250 can submit task1, task2 and taskN-M one immediately after another or within a certain time between each other. As such, the technical computing workers 270A-270N can be performing technical computing of their respective tasks independently and in parallel to each other. Alternatively, the technical computing workers 270A-270N may perform technical computing of their respective task while the other technical computing workers are idle.

In another embodiment, the technical computing workers 270A-270N may include interfaces and communication channels to interact with each other as depicted by the phantom arrowed lines between the technical computing workers 270A-270N in FIG. 3A. In such an embodiment, technical computing worker 270A may perform a portion of technical computing on task1, and then submit task1, and optionally, any generated result or other data, for further technical computing by technical computing worker 270B. Also, the technical computing worker 270A may also submit the result of its technical computing of task1 to the technical computing client 250, before or after, submitting the task to technical computing worker 270B for further processing. Technical computing worker 270B may in turn perform technical computing of task1, and subsequently submit task1 for further processing by technical computing worker 270N. For additional configurability, the technical computing workers 270A-270N can obtain information with the task about the identification of other technical computing workers 270A-270N in the system. This information would be used to communicate and interact with another technical computing worker. Alternatively, a technical computing worker 270A may find another technical computing worker 270B-270N by making a function or system call, or a method call to a service provider on the network 140. In such a configuration, technical computing workers 270A-270N can either execute tasks independently and in parallel to each other, or also execute tasks serially and subsequent to each other.

Referring now to FIG. 3B, the automated task distribution mode embodied in system 310 is intended to provide a configuration where the user does not want to control which technical computing worker 270A-270N executes a particular task. In brief overview of the automated distribution mode of system 310, a technical computing client 250 is in communication with the automatic task distribution mechanism 260 running on the server 160. The automatic task distribution mechanism 260 is in communications with a plurality of technical computing workers 270A-270N. Under this mode of operation, the technical computing client 250 is not required to have any specific knowledge of the technical computing workers 270A-270N, e.g., the name of the workstation running a technical computing worker 270A-270N, or the availability of the technical computing worker 270A-270N to perform technical computing of a task. In alternative embodiments, it may have prior knowledge of all or a portion of the technical computing workers 270A-270N available on the network. Even with knowledge of the name or availability of technical computing workers 270A-270N on the network 140, the technical computing client 250 can choose not to specify the name of a particular technical computing worker to perform the task, and let the automated distribution mechanism distribute the task to any available technical computing worker 270A-270N.

In FIG. 3B, the technical computing client 250 submits one or more tasks (Task1-TaskN-M) to the automatic task distribution mechanism 260. These tasks can be submitted sequentially or in an order and frequency as specified by the technical computing client 250. The automatic task distribution mechanism 260 obtains the tasks (Task1-TaskN-M) to make then available for distribution to any of the technical computing workers 270A-270N. A technical computing worker 270A-270N takes a task from the automatic task distribution mechanism 260 for technical computing of the task, computes a result for the task and provides the result to the automatic task distribution mechanism 260. For example, technical computing worker 270A takes task 1 from the automatic task distribution mechanism 260, computes a result, Result 1, for task 1, and submits Result 1 to the automatic task distribution mechanism 260. The automatic task distribution mechanism 260 makes the results (Result1-ResultN-M) available to the technical computing client 250 as they get submitted from the technical computing worker 270A-270N generating and submitting the respective result. At a time or method determined by the technical computing client 250, the technical computing client 250 obtains the results of the computed tasks from the automatic task distribution mechanism 260. For example, the technical computing client 250 may obtain all the results (Result1-ResultN-M) at the same time after all the results have been computed, or each result may be obtained after it becomes available in the automatic task distribution mechanism 260. Accordingly, the technical computing client 250 can determine the order and frequency of obtaining one or more of the results. As with the direct distribution mode, the technical computing workers 270A-270N can also communicate and interact with each other, as depicted by the phantom arrowed lines between the technical computing workers 270A-270N in FIG. 3B, to execute tasks both serially and in parallel by submitting a task to another technical computing worker 270A-270N.

The batch mode of automated task distribution embodied in system 315 of FIG. 3C is intended to provide a configuration where the user can specify a group of related tasks as a job and provide the batch of tasks, or the job, to the automatic task distribution mechanism 260. In brief overview of the batch mode of the automatic distribution system 315, a technical computing client 250 is in communication with the job manager 265 on the server 160. The job manager 265 interfaces and communicates with the automatic task distribution mechanism 260 running on the same server 160. Each of the technical computing workers 270A-270N is in communication with the automatic task distribution mechanism 260. A job manager 265 interfaces with and is associated with one automatic task distribution mechanism 260. Alternatively, the job manager 265 and the automatic task distribution mechanism could be on different servers, e.g., 160 and 160'. Additionally, a plurality of job managers and automatic task distribution mechanisms could be running on a single server 160 or each on their own server (160', 160'', etc). Each of the plurality of job managers interface with and are associated with one of the plurality of automatic distribution mechanisms. This allows the distributed system to scale the number of instances of the job manager 265 and the automatic distribution mechanism 260 to handle additional multiple technical computing clients 250 distributing tasks.

In batch mode as depicted in FIG. 3C, the technical computing client 250 defines the job. The technical computing client 250 has a programming language environment by which it can declare tasks, declare a job and associate the tasks with the job. Instead of submitting each task separately as depicted in FIG. 3B, the technical computing client 250 submits the job containing all the associated tasks to the job manager 265. The job manager 265 is a software component that provides an object-oriented interface to the automatic task distribution mechanism 260. The job manager 265 obtains the tasks from the job and provides the tasks to the automatic task distribution mechanism 260 for technical computing workers 270A-270N to take and compute results. For example, technical computing client 250 defines a job, Job1, with a set of three tasks: Task1, Task2 and TaskN-M. The technical computing client 250 then submits Job1 to the job manager 265. The job manager 265 obtains Job1 and obtains each of the tasks, Task1-TaskN-M from Job 1. Then, according to the configured logic of the job manager 265, described in more detail below, the job manager 265 submits each of the tasks to the automatic task distribution mechanism 260 for technical computing by a technical computing worker 270A-270N. Technical computing worker 270A may take Task1 from the automatic task distribution mechanism 260, compute a Result1 for Task1 and provide the Result1 to the automatic task distribution mechanism 260. Technical computing worker 270B and technical computing worker 270N, in a similar fashion, compute and provide results for Task2 and TaskN-M respectively. The job manager 265 then obtains the set of results for the completed job of Job1 and provides the results of each of the tasks to the technical computing client 250.

The job manager 265 further comprises a queue 267 for arranging and handling submitted jobs. For example, the job manager 265 may handle jobs in a first-in first-out (FIFO) manner. In this case, the job manager 265 does not process the next job until all the tasks from the current job have been processed by the automatic task distribution mechanism 260. Additionally, the job manager 265 using the queue 267 supports handling multiple job submissions and task distribution from multiple technical computing clients 250. If a first technical computing client 250 submits a job, Job1, the job manager 265 places that job first in the queue 267. If a second technical computing client, e.g., 250', submits a second Job, for example, Job 2, the job manager places the job in the queue behind the Job1 from the first client. In this manner, all technical computing clients (250, 250', 250'') accessing the services of the job manager 265 get serviced for task distribution. One ordinarily skilled in the art will recognize that the job manager 265 could implement a variety of algorithms for processing jobs in a job queue 267 and for handling multiple technical computing clients (250, 250', 250''). For example, a user may be able to specify a priority level for a specified job, or the logic of the job manager 265 may make task distributing and processing decisions based on the configuration and availability of technical computing workers 270A-270B to determine a preferred or optimal selection of technical computing of jobs and tasks.

As with the other distribution modes of FIG. 3A and FIG. 3B, the technical computing workers 270A-270N in batch mode can also communicate and interact with each other as shown by the phantom arrowed lines between technical computing workers 270A-270N in FIG. 3C. This allows the technical computing workers 270A-270N to execute tasks both serially and in parallel by submitting a task to another technical computing worker. As part of the information associated with the task obtained by a technical computing worker or by other means, such as a system or function call, or a method call to a service, a technical computing worker 270A can obtain information about the other technical computing workers 270B-270N assigned to or working on tasks associated with a specific job, or available on the network 140.

The exemplary embodiment of the batch mode of automated task distribution system 320 of FIG. 3D depicts a configuration where the job manager 265 contains the automatic task distribution mechanism 260. In brief overview of system 320, a technical computing client 250 is in communication with the job manager 265 on the server 160. The job manager 265 comprises a task distribution mechanism 260 running as part of the job manager 265 on the same server 160. The job manager 265 further comprises a queue 267 for arranging and handling submitted jobs. The technical computing workers 270A-270N are in communication with the job manager 265 to receive tasks from the automatic task distribution mechanism 260 of the job manager 265.

In batch mode operation as depicted in FIG. 3D, the technical computing client 250 defines the job comprised of related tasks. Instead of submitting each task separately as depicted in FIG. 3B, the technical computing client 250 submits the job containing all the related tasks to the job manager 265. The job manager 265 obtains the tasks from the job and submits the tasks, via an automatic task distribution mechanism 260, to the technical computing workers 270A-270N to perform technical computing. For example, technical computing client 250 defines a job, Job1, with a set of three tasks: Task1, Task2 and TaskN-M. The technical computing client 250 then submits Job1 to the job manager 265. The job manager 265 obtains Job1 and obtains each of the tasks, Task1-TaskN-M, from Job 1. Then, the automatic task distribution mechanism 260 of the job manager 265 submits each of the tasks to a technical computing worker 270A-270N for technical computing. For example, the job manager 265 may submit Task 1 to technical computing worker 270A to compute and produce a Result1 for Task1. Technical computing worker 270A provides the Result1 to the job manager 265. In a similar fashion, the job manager 265 may submit Task2 and TaskN-M to technical computing worker 270B and technical computing worker 270N with each technical computing worker 270A and 270B providing the results for Task2 and TaskN-M respectively to the job manager 265. When all the results from each of the tasks of Job1 are received, the job manager 265 then provides the results of each of the tasks of Job 1 to the technical computing client 250.

In the batch mode of operation of depicted in FIGS. 3C and 3D, the job manager 265 or automatic task distribution mechanism 260 can be configured to define the minimum and maximum numbers of technical computing workers 270A-270N to perform the tasks associated with a job. This feature can be configured on a job by job basis. Alternatively, it may be configured for a portion or all of the jobs. The configuration of these settings can be facilitated through parameters associated with a submitted job, such as in one or more properties of a job object, or in one or more fields of a data structure representing a job. Alternatively, these settings may be facilitated through any interface of the job manager 265 or automatic task distribution mechanism 260, such as in a configuration file, graphical user interface, command or message or any other means by which values for these settings may be set.

The system (e.g. 315 or 320) can compare the number of technical computing workers 270A-270N registered, or otherwise available, with the job manager 265 or automatic task distribution mechanism 260 against the configured setting of the minimum number of technical computing workers parameter. The system may not start a job unless there is a minimum number of technical computing workers 270A-270N registered or available to work on the job. In a similar manner, the system can check the number of available or registered technical computing workers 270A-270N against the setting of the maximum number of technical computing workers parameter. As the system distributes tasks of a job, it can make sure not to distribute tasks to more than the defined number of technical computing workers 270A-270N. In some embodiments, the minimum number of technical computing workers will be set to a value equal to the setting of the maximum number of technical computing workers. In such a case, the system may only start the job if the minimum number of technical computing workers 270A-270A are available or registered to start the job, and may not use any more technical computing workers 270A-270N than the minimum setting. This is useful for cases where the user wants to configure a job to have each task be assigned to and run on separate technical computing workers 270A-270N. For example, a job may have 5 tasks and the minimum and maximum technical computing worker settings may be set to 5.

Additionally, in any of the embodiments depicted in FIGS. 3A-3D, the system can determine or select the technical computer worker 270A-270N to work on a task by operational and/or performance characteristics of the technical computing worker 270A-270N and/or workstation 170A-170N. For example, a technical computing worker 270A may work on a task based on the version of Distributed MATLAB® that is installed on the workstation 170A or that the technical computing worker 270A is capable of running. Additionally, the technical computing worker 270A-270N and workstation 170A-170N may have a specification or profile, such as a benchmark comparison results file, which provides a description of any operational and performance characteristics of the version of Distributed MATLAB® running on that specific computing device 102 of the workstation 170A. This profile can be in comparison to known benchmarks of operational and performance characteristics of Distributed MATLAB® running on certain computing devices (102, 102"), with specified versions of Distributed MATLAB®, operating systems and other related software, or any other system component or attribute that may impact the operation or performance of Distributed MATLAB®. This profile may be described in a file accessible over the network or retrievable through an interface mechanism of the technical computing worker 270A-270N. Furthermore, the system may determine the technical computing worker 270A-270N to work on a task by any configuration or properties set on the technical computing worker 270A-270N or workstation 170A-170N. For determining a technical computing worker 270A-270N to work on a task, the system may discover any configuration, properties, and operational and performance characteristics of the Distributed MATLAB® of a technical computing worker 270A-270N running on a workstation 170A-170N through any interface of the technical computing worker 270A-N or workstation 170A-170N, such as, for example, in a file, graphical user interface, command or message.

Figure 4:
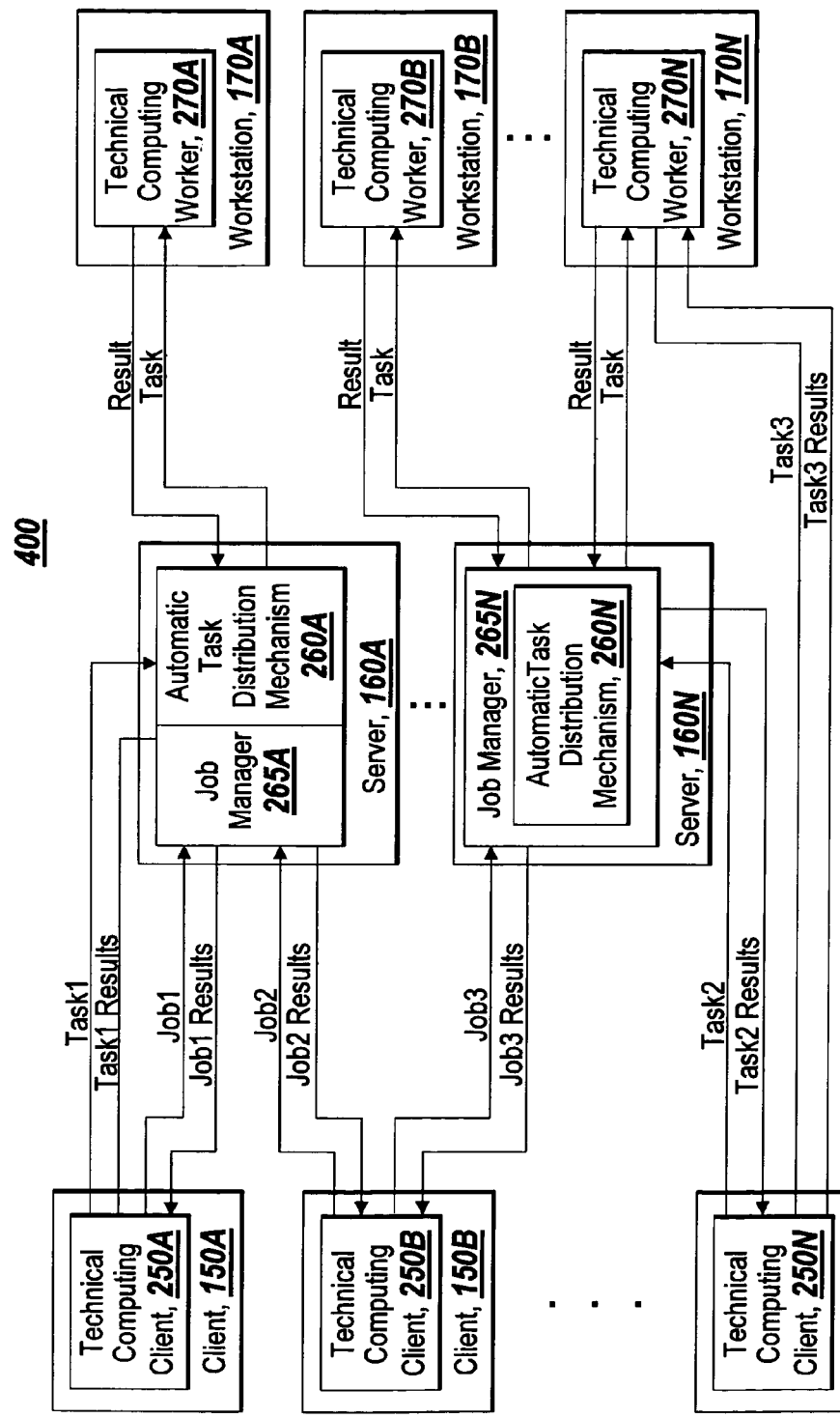
FIG. 4 is a block diagram illustrating a multiple mode of operation embodiment of the present invention.

Distributed MATLAB® of the present invention also provides additional flexibility in that the multiple modes of task distribution can be performed concurrently in the distributed system. FIG. 4 is an illustrative embodiment of the present invention showing the distributed application performing, concurrently, the combination of the modes of operation depicted in FIGS. 3A-3C. Additionally, the distributed system 400 is depicted supporting multiple clients 250A-250N communicating with multiple job managers 265A-265N and multiple automatic task distribution mechanisms 260A-260N. With these multiple modes of operation, any technical computing client 250A-250N can distribute tasks directly to a technical computing worker 270A-270N, submit tasks to the automatic task distribution mechanism 260, or submit a job to the job manager 265. In the depicted multi-client distributed system 400, a plurality of technical computing clients 250A-250N are in communication with one or more job managers 265A-265N. The job manager 265A can be a separate component interfacing to the automatic task distribution mechanism 260A, or the job manager 265N can be a single application comprising the functionality of the automatic task distribution mechanism 260N. The one or more technical computing workers 270A-270B are in communication with the one or more job managers 265N or the one or more automatic task distribution mechanisms 260A. The distributed architecture of the present invention allows for a scalable and flexible distributed technical computing environment supporting a variety of deployments and network topologies.

For example, as shown in FIG. 4, a technical computing client 250A can operate in both the direct distribution mode and the batch automated distribution mode. As such, technical computing client 250A can submit a task to and receive a result from the automatic task distribution mechanism 260A without using the job manager 265A. In another instance, technical computing client 250A can submit a job, Job1, to the job manager 265A for task distribution by the automatic task distribution mechanism 260A to receive results from the job, such as Job1 Results. In another example of FIG. 4, technical computing client 250B can operate in batch automated distribution mode but submit jobs separately to a first job manager 265A running on a first server 160A and a second job manager 265N running on a second server 160N. In yet another example, technical computing client 250N operates in both the automated distribution and direct distribution modes. Technical computing client 250N submits a task, Task2, to automatic task distribution mechanism 260N and receives a result, Task2Result, from computing by a technical computing worker 270A-270N assigned by the system 400. Technical computing client 250N also directly submits a task to technical computing worker 270N and receives a computed result directly from the technical computing worker 270N. One ordinarily skilled in the art will appreciate the various combinations of deployments that can occur with such a distributed system 400 with multiple modes of operation. As such, the present invention offers scalability and flexibility for distributed processing of complex technical computing requirements.

Figure 5A:
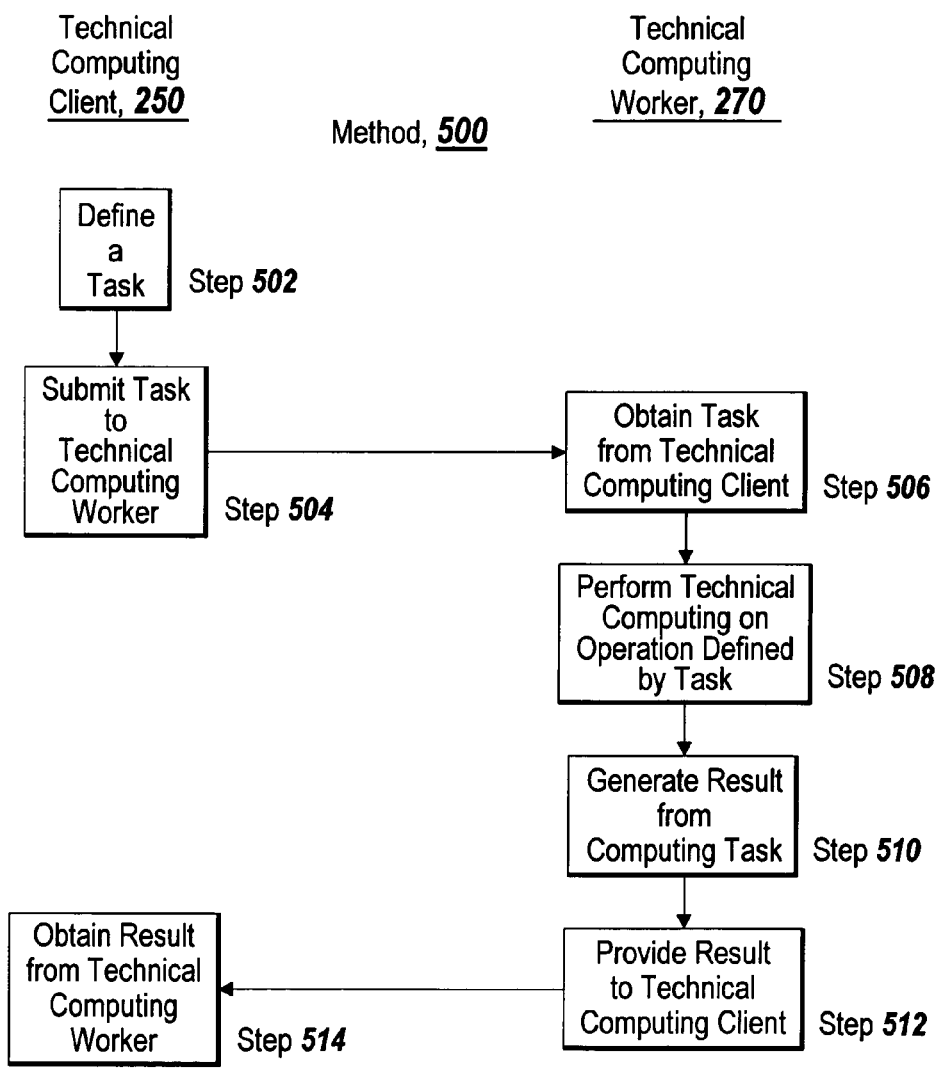
FIG. 5A is a flow diagram of steps performed in an embodiment of FIG. 3A.
Figure 5B:
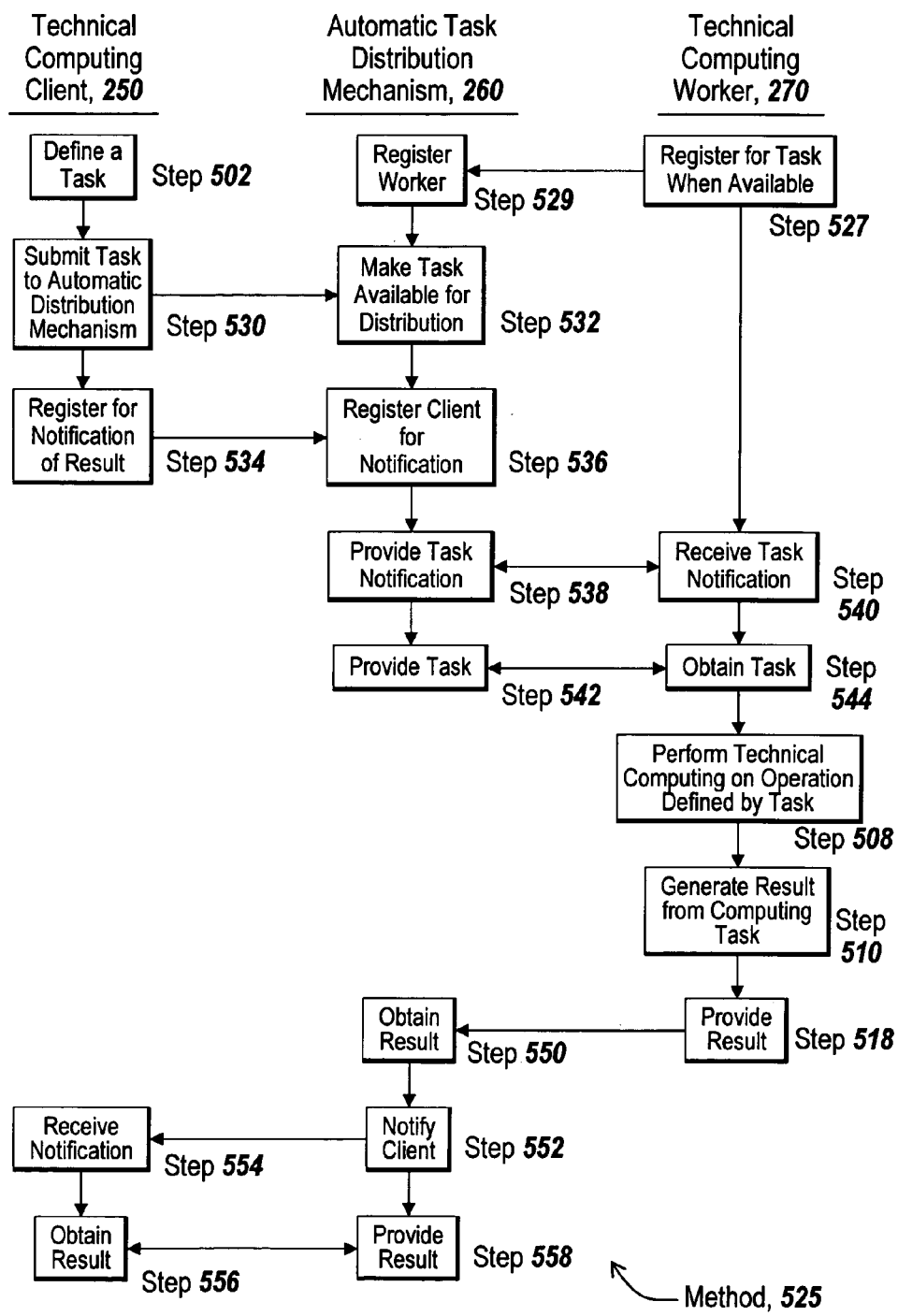
FIG. 5B is a flow diagram of steps performed in an embodiment of FIG. 3B.
Figure 5C:
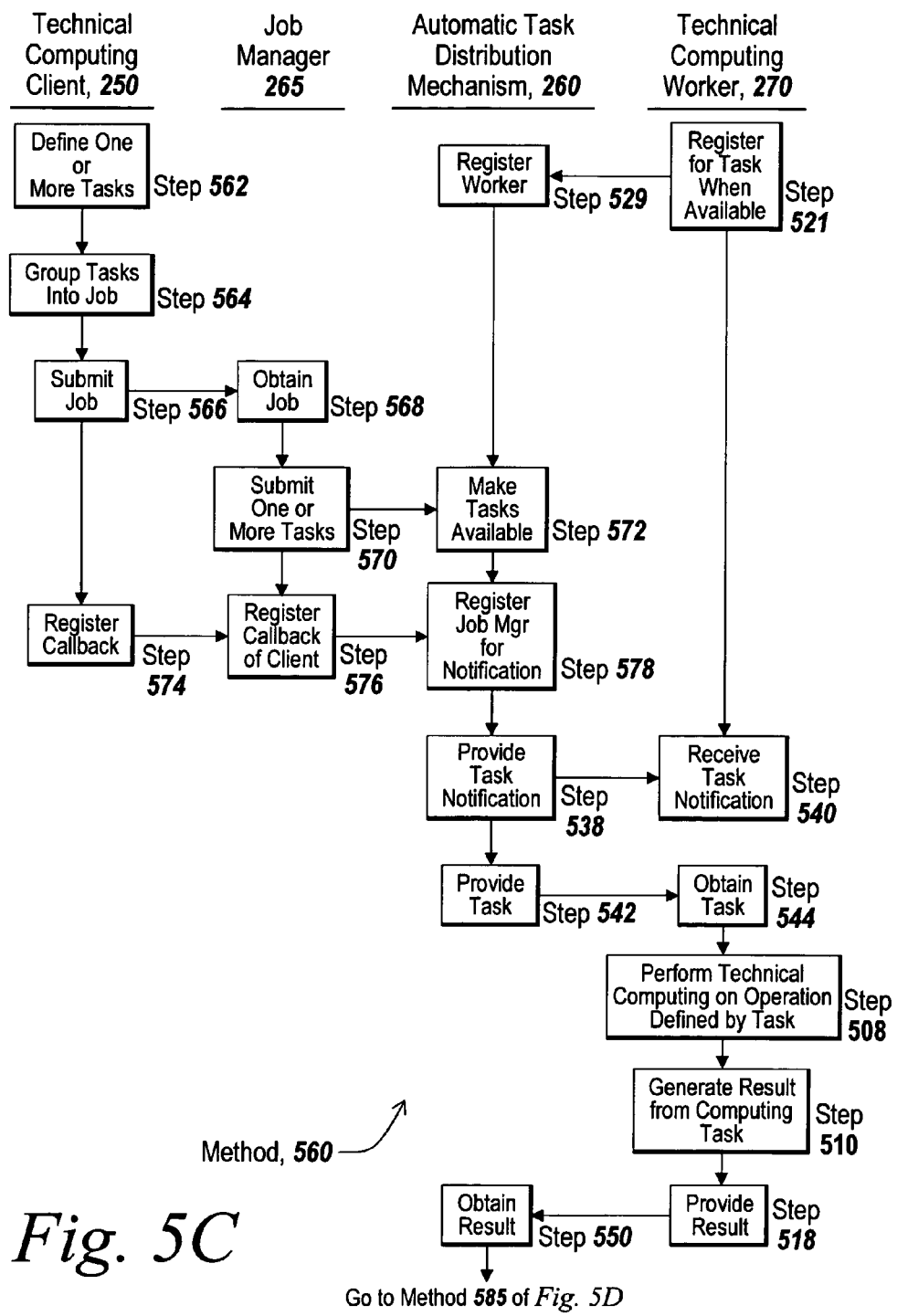
FIG. 5C and FIG. 5D are flow diagrams of steps performed in a batch mode of operations of the present invention.

In another aspect, the present invention relates to methods for distributing tasks to technical computing workers 270A-270N for processing, either directly, or indirectly and automatically, as described above in reference to the embodiments depicted in FIGS. 3A-3C. FIGS. 5A, 5B and 5C each show a flow diagram of the methods of the three modes of task distribution of Distributed MATLAB.® FIG. 5A depicts the method of direct distribution, FIG. 5B, the method of an automated distribution, and FIG. 5C, a batch mode method of automated distribution.

Referring now to FIG. 5A, one embodiment of the method 500 to distribute a task from a technical computing client 250 to a technical computing worker 270 is illustrated. Method 500 is practiced with the direct distribution embodiment of the invention depicted in FIG. 3A. The technical computing client 250 defines a task comprising an operation for technical computing (step 502). The task defines a function, command or operation, such as may be available in the programming language of MATLAB®, and the number of arguments and input data of the arguments. The technical computing client 250 then submits the task (step 504) to the technical computing worker 270. The technical computing worker 270 receives the task (step 506) and performs the requested technical computing as defined by the task (step 508). In performing the technical computing on the task, an associated result may be generated (step 510). In alternative embodiments, either no result is generated, or no result is required to be returned to the technical computing client 250. After generating the result from computing the task, the technical computing worker 270 provides the result (step 512) to the technical computing client 250, and the technical computing client 250 obtains the result from the technical computing worker 270 (step 514).

Referring now to FIG. 5B, an embodiment of the method 525 to distribute a task from a technical computing client 250 to a technical computing worker 270 in automated task distribution mode is illustrated. Method 525 is practiced with the automatic task distribution embodiment of the invention depicted in FIG. 3B. A technical computing worker 270 registers to receive notification of one or more tasks (step 527) becoming available, or appearing, in the automatic task distribution mechanism 260. The technical computing client 250 defines a task comprising an operation for technical computing (step 502). The technical computing client 250 then submits the task (step 530) to the automatic task distribution mechanism 260. The automatic task distribution mechanism 260 receives the task and makes the task available for distribution (step 532) to a technical computing worker 270. The technical computing client registers (step 534) with the automatic task distribution mechanism 260 to receive notification when a result associated with the task submitted in step 530 is available, or appears, in the automatic task distribution mechanism 260. The automatic task distribution mechanism 260 registers the technical computing client 250 for notification when the result appears (step 536). The automatic task distribution mechanism 260 provides notification (step 538) to the technical computing worker 260 of the availability of the task. In response to receiving the notification (step 540), the technical computing worker obtains (step 544) the task provided (step 540) from the automatic task distribution mechanism 260. The technical computing worker 270 performs the requested technical computing on the function or command as defined by the task (step 508). In performing the technical computing on the task, an associated result may be generated (step 510). In alternative embodiments, either no result is generated or the result is not required to be returned to the technical computing client 250. After generating the result from computing the task (step 510), the technical computing worker 270 provides the result (step 512) to the automatic task distribution mechanism 260. After obtaining the result from the technical computing worker 250 (step 550), the automatic task distribution mechanism 260 notifies (step 552) the technical computing client 250 that the result is available. The technical computing client 250 obtains (step 556) the result provided (step 558) by the automatic task distribution mechanism 260.

Figure 5D:
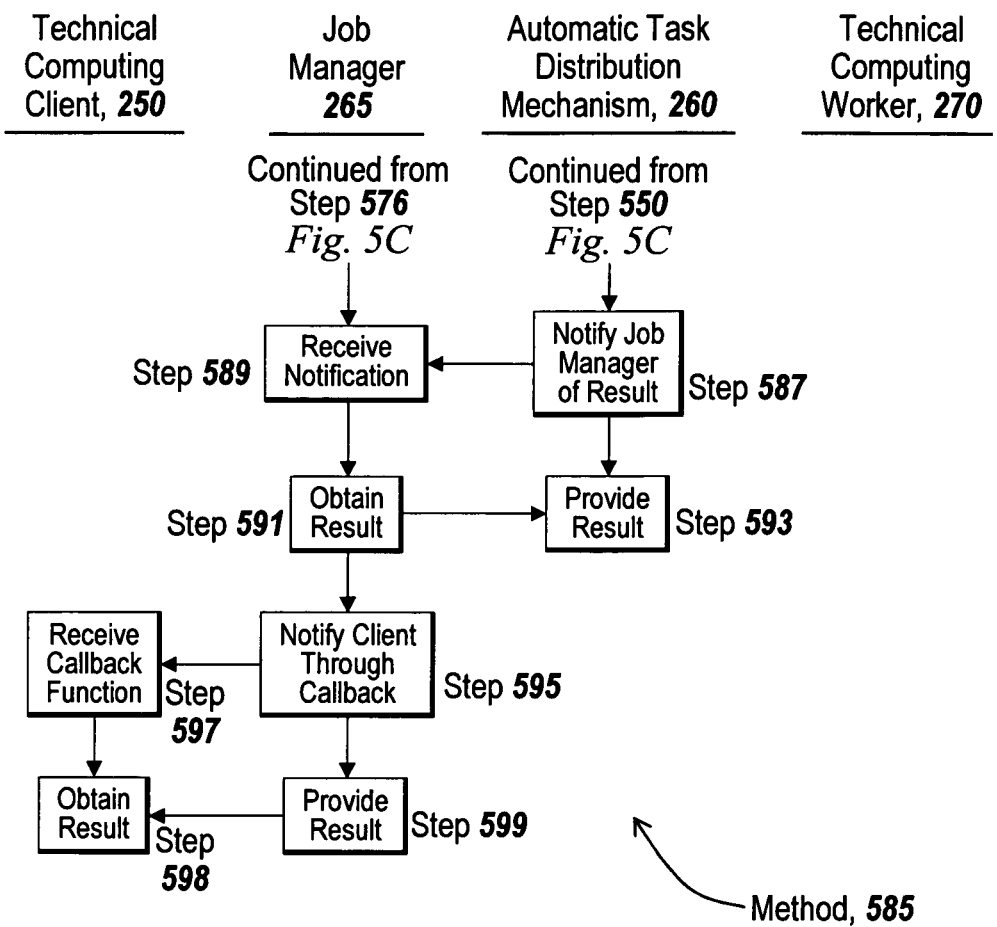

Referring now to FIGS. 5C and 5D, one embodiment of the method 560 to distribute a task from a technical computing client 250 to a technical computing worker 270 in a batch mode of operation is illustrated. Method 560 is practiced with the batch mode of the automatic task distribution system (e.g. 315 or 320). A technical computing worker 270 registers to receive notification of one or more tasks (step 527) becoming available, or appearing, in the automatic task distribution mechanism 260. In an exemplary embodiment, the technical computing worker registers to receive a task from the job manager 265 or automatic task distribution mechanism 260 as notification to perform computing on the task. The technical computing client 250 defines one or mores tasks (step 562), with one or more of the tasks comprising an operation or function for technical computing. The technical computing client 250 groups one or more tasks of the tasks into a job (step 564). The technical computing client 250 then submits the job (step 566) to the job manager 265. The job manager 265 obtains the job (step 568) from the technical computing client 250 and provides the one or more tasks of the job (step 570) to the automatic task distribution mechanism 260, which makes the one or more tasks available for distribution (step 572) to one or more technical computing workers 270A-270N. In an exemplary embodiment, the job manager 265 or the automatic task distribution mechanism 260 may submit the one or more tasks to the one or more technical computing workers 270A-270N. In another embodiment, the technical computing worker 270 may take the task from the job manager 265 or the automatic task distribution mechanism 260.

The technical computing client 250 registers (step 574) a callback function with the job manager 265. The technical computing client 250 may setup and/or register other callback functions based on changes in the state of processing of a task or job, or changes in the state of the job manager, or other events available to trigger the calling of a function. The job manager 265 calls this function when the job is completed, i.e., when each of the one or more tasks of the job have been completed. In turn, the job manager 265 may register (step 576) with the automatic task distribution mechanism 260 to receive notification of the results of the submitted tasks appearing in the automatic task distribution mechanism 260, or being received from the technical computing worker 270A-270N. In one embodiment, the automatic task distribution mechanism 260 registers the notification request of the job manager (step 578). Then, the automatic task distribution mechanism 260 provides notification to the technical computing worker 270 of the availability of the task (step 538). In an exemplary embodiment, the task is sent, by the job manager 265 to the technical computing worker 270 as notification to perform the task. In response to receiving the notification or the task (step 540), the technical computing worker 270 obtains (step 542) the task provided (step 540) from the automatic task distribution mechanism 260 or the job manager 265. The technical computing worker 270 performs the requested technical computing on the operation as defined by the task (step 508). In performing the technical computing on the task, an associated result may be generated (step 510). In alternative embodiments, either no result is generated or the result is not required to be returned to the technical computing client 250. After generating the result from computing the task (step 510), the technical computing worker 270 provides the result (step 510) to the automatic task distribution mechanism 260 or the job manager 265. After obtaining the result from the technical computing worker 250 (step 550), the automatic task distribution mechanism 260 notifies (step 587) the job manager 265 that the result is available. In an exemplary embodiment, the job manager 265 receives the results from the technical computing worker 270. In response to receiving the notification or the result (step 589), the job manager 265 obtains the result (step 591) provided by (step 593) the automatic task distribution mechanism 260. If the job manager 265 received the last result of the job, the job manager 265 will notify the technical computing client 250 that the job is completed via the registered callback function (step 595). After triggering the completed job callback function (step 597), the technical computing client 250 obtains (step 598) the result provided (step 599) by the job manager 265.

With the methods of task distribution described above (methods 500, 525, and 560) in view of the embodiment of the concurrent multiple distribution modes of operation depicted in system 400 of FIG. 4, one ordinarily skilled in the art will recognize the application of the above methods to the multiple modes of operation for each technical computing client 250A-250N in FIG. 4.

Figure 6A:
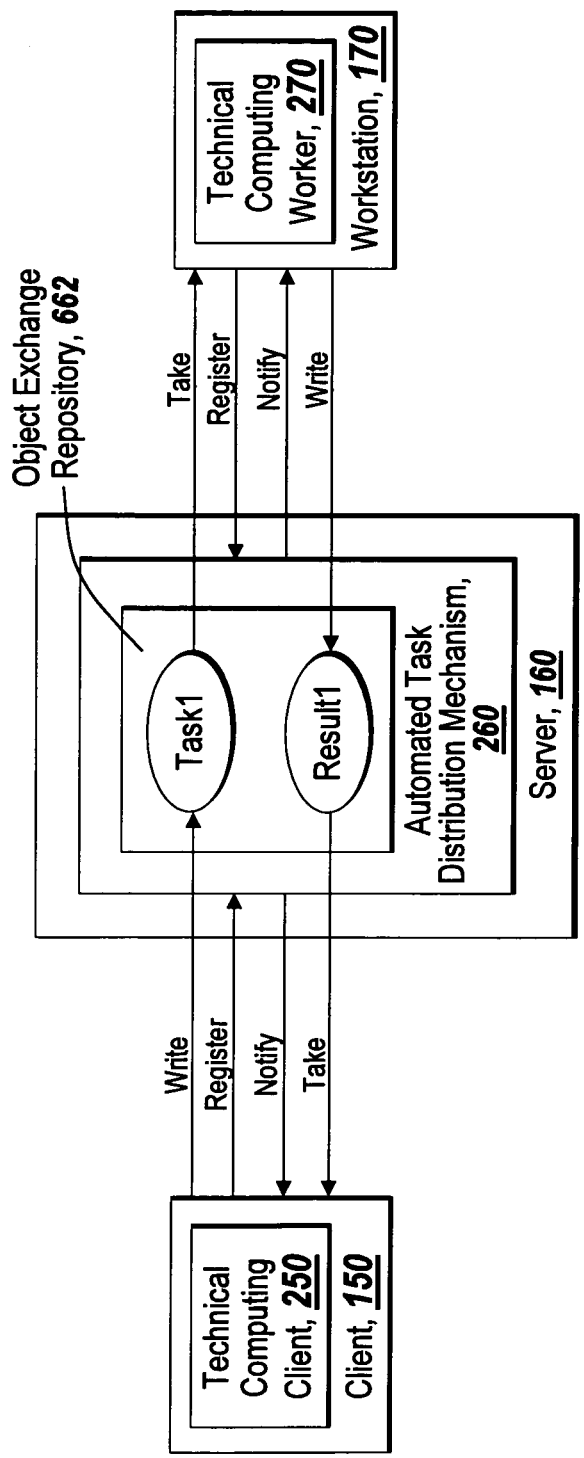
FIG. 6A is a block diagram depicting the details of the automatic task distribution mechanism.

FIG. 6A shows the details of one embodiment of the automation features of a technical computing client 250 and technical computing worker 270 distributing tasks and results with the automatic task distribution mechanism 260. The automatic task distribution mechanism 260 may be object-oriented and comprise an object exchange repository 662, such as Javaspace, a Sun Microsystems, Inc. technology for distributed application development built using Jini network technology also from Sun Microsystems, Inc.

The JavaSpace technology views an application as a collection of processes cooperating via a flow of objects into and out of an object exchange repository 662, known as a space. It does not rely on passing messages directly between processes or invoking methods directly on remote objects. A key feature is that spaces are shared. Many remote processes, such as technical computing workers and job managers of the present invention, can interact with the network accessible object storage of a space. Spaces are also persistent and therefore, provide reliable storage. Spaces are also associative in that objects in the space can be located by associative lookup rather than by memory location or identifier, e.g., in a shared memory solution. Additionally, a space has a few key operations to perform on the object repository to handle the exchanging of objects. A write operation writes an object, such as a task object, to the space. A take operation takes an object, such as result object, from the space. A take is the equivalent of a read and removes the object from the space. A read operation obtains a copy of the object from the space and leaves the object intact in the space. Other operations allow remote processes, such as technical computing workers, technical computing clients and job managers to register for event notification when a certain object appears in the space. An object appears in the space when a process writes the object to the space. The remote process listens for the appearance of objects in the space and the space notifies the registered remote process when the object appears.

In an alternative embodiment of the present invention, an object exchange repository such as one implemented with JavaSpace technology is used to provide a level of indirection between the technical computing client 250 and the technical computing worker 270 with regards to task and result objects. By the automatic communication features described above, the technical computing client 250 does not need to specify a named technical computing worker 270 to perform technical computing. The automatic task distribution mechanism 260 comprising the object exchange repository 662 handles task distribution to technical computing workers 270A-270N registered with the automatic task distribution mechanism 260. To distribute tasks and results, the technical computing client 250 and technical computing worker 270 read and write task and result objects to the object exchange repository 662.

Referring now to FIG. 6A, a technical computing client 250 executes a write transaction to write a task object to the object exchange repository 662 of the automatic task distribution mechanism 260. The task object defines a task for technical computing by a technical computing worker 270 who obtains the task object from the object exchange repository 662. The technical computing client 250 registers with the object exchange repository 662 to be notified when a result object associated with the submitted task object is available in the object exchange repository 662. In this way, the technical computing client 250 can listen for the appearance of results for tasks submitted for technical computing processing. A technical computing worker 270 registers with the object exchange repository 662 to be notified when a task object appears in the object exchange repository 662. After the technical computing client 250 writes the task object, the object exchange repository 662 sends a notification to the technical computing worker 270 informing of the task object being available in the object exchange repository 662. The technical computing worker 270, in response to the notification, performs a take operation on the object exchange repository 662 to retrieve the submitted task object. The take operation removes the task from the object exchange repository 662. In the alternative, a read operation can be performed to get a copy of the task object without removing it from the object exchange repository 662.

The technical computing work 270 obtains the name and arguments of the function to compute from the data structure of the task object. Then the technical computing worker 270 provides the result from the computation by performing a write operation to write a result object to the object exchange repository 662. The result object defines within its data structure a result of the computation of the function defined in the task object and performed by the technical computing worker 270. The write of the result object to the object exchange repository 662 triggers the notification event registered by the technical computing client 250. The technical computing client 250 listening for the result to appear in the object exchange repository 662, in response to the notification, performs a take operation, or alternatively a read operation, to obtain the result object associated with the submitted task. The technical computing client 250 then obtains the result information defined within the data structure of the retrieved result object.

Figure 6B:
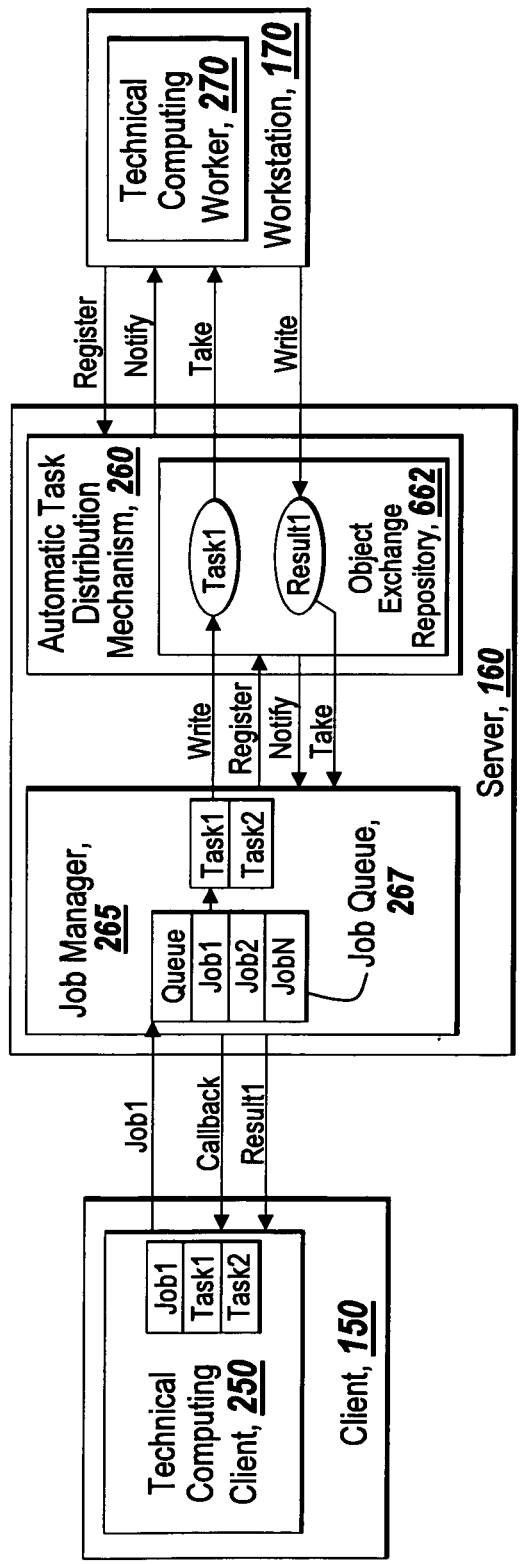
FIG. 6B is a block diagram depicting the details of the automatic task distribution mechanism with a job manager.

FIG. 6B depicts the operations of the automatic task distribution mechanism 260 interfacing with a job manager 265. In this embodiment, the job manager 265 is a software component providing a front-end interface to the automatic task distribution mechanism 260, and in this exemplary embodiment, the JavaSpace object exchange repository 662. The job manager 265 supports the batch mode of automatic task distribution operation of the invention. Under batch processing, tasks are grouped into a job in the technical computing client 250 and then the job is submitted to the job manager 265 for task distribution and task processing by a technical computing worker 270. When the job manager 265 receives a job from one or more technical computing clients 250A-250N, the job manager 265 places the job into a position in a job queue 267. The job queue 267 is a data structure for holding and arranging jobs, and maintaining the state and other attributes about the job while the job is being processed. The job manager 265 handles jobs in a first-in first-out (FIFO) manner and manages the job queue 267 to first take out the job that was first received by the job manager 265 and placed into the job queue 267. For example, the job queue 267 depicted in FIG. 6B is holding the jobs of job1, job2 through jobn. Job1 is the first submitted to the job manager 265 and is positioned at the top of the job queue 267. Job2 through JobN are the next subsequent jobs in the job queue 267 in order of a FIFO queuing system. While Job1 is being processed, the job manager 265 does not start to process the next job, Job2, until there are no tasks from the Job1 remaining to be processed in the object exchange repository 662. One ordinarily skilled in the art will appreciate the variations of job management implementations that may be accomplished using a job queue with different queuing and priority mechanisms.

Still referring to FIG. 6B, the technical computing client 250 submits a job to the job manager 265 and specifies a callback function with the job manager 265. The job manager 265 is to call the callback function when the job is completed. The job manager receives the job, e.g., job1, and places the job into a job queue 267. The job manager 265 then obtains the one or more tasks from the first job submitted to the job queue. In the embodiment of a JavaSpace implementation of the object exchange repository 662, the job manager 265 writes the task object to the object exchange repository 662. The job manager 265 registers with the object exchange repository 662 to receive a notification when a result object associated with the task appears in the object exchange repository 662, also known as a space. The job manager 265 listens and waits for the result to appear in the object exchange repository 662.

A technical computing worker 270 registers with the object exchange repository 662 to receive a notification when a task object appears in the object exchange repository 662. Then the technical computing worker 270 listens for the appearance of task objects. When the task is submitted to the object exchange repository 662 by the job manager 265, the technical computing worker 270 receives a notification and takes the task from the object exchange repository 662 by performing a take operation. The technical computing worker 270 obtains the function to be executed from the definition of the function in data structure of the task object, performs the function and generates a result of the function for the task. Then the technical computing worker 270 submits a result object representing a result of the task to the object exchange repository by performing a write operation. The job manager 265 waiting for the result to appear in the object exchange repository 662 receives a notification from the object exchange repository 662 that the result is available. The job manager 265 checks to see if this is the last result to be obtained from the object exchange repository 662 for the job currently being processed. If the result is the last result, the job manager 265 then notifies the technical computing client 250 that the job is completed by calling the registered callback function. In response to executing the callback function, the technical computing client 250 then interfaces with the job manager 265 to retrieve the results from the job manager 265, which the job manager 265 retrieves from the object exchange repository 662 by performing a take operation.

Figure 6C:
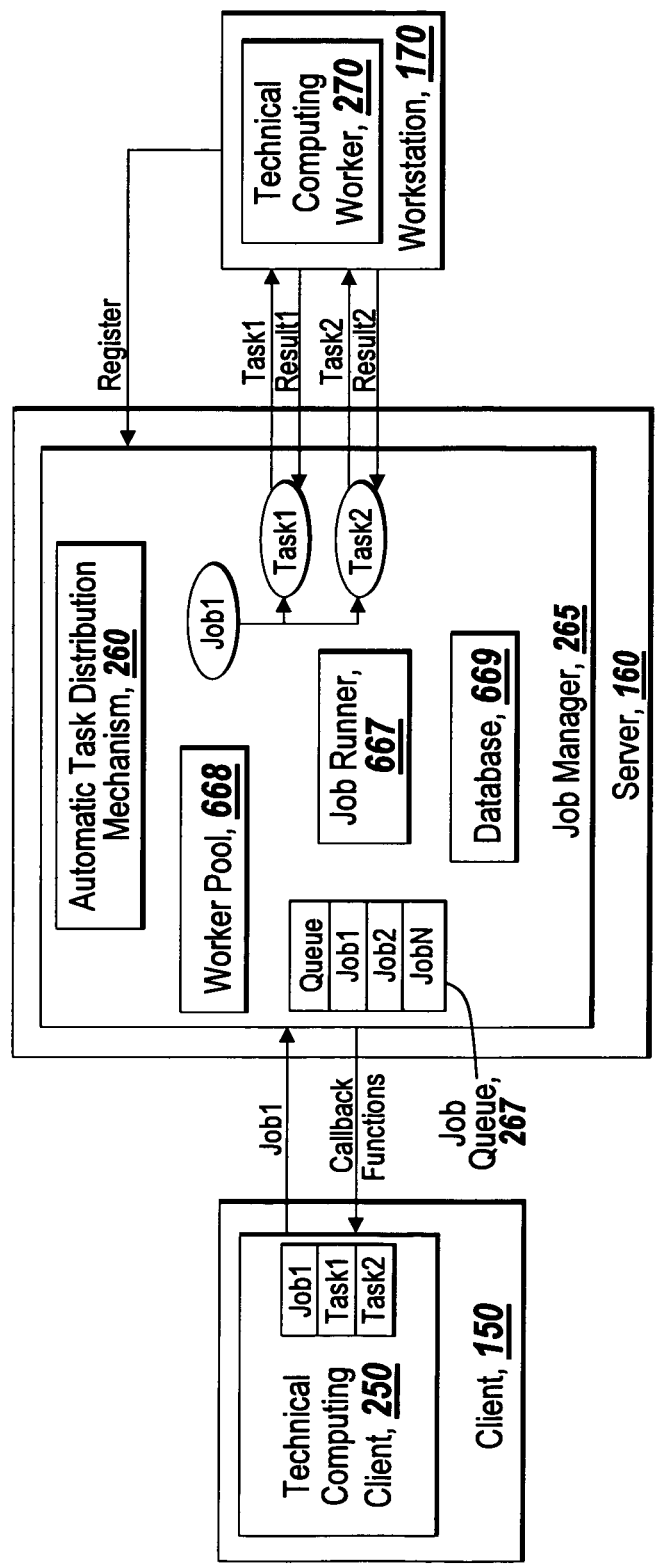
FIG. 6C is a block diagram depicting the details of a job manager comprising the automatic task distribution mechanism.

FIG. 6C depicts an exemplary embodiment of details of the batch mode of operation of the present invention using a database rather than an object exchange repository. In this embodiment, the job manager 265 includes the functionality of the automatic task distribution mechanism 260. In brief overview, the technical computing client 250 is in communication with the job manager 265, which is in communication with the technical computing worker 270. The job manager comprises a job queue 267, an automatic task distribution mechanism 260, a job runner 667, a worker pool 668 and a database 669. Any of these components of the job manager 265 can be a separate library, interface, software component or application. In an exemplary embodiment, these components can be running in their own processing thread to provide multi-tasking capabilities.

The worker pool 668 contains a list of technical computing workers 270A-270N that are available to work on a task. These technical computing workers 270A-270N may on startup register with a job manager 265. The name of the job manager 265 the technical computing worker 270A-270N is associated with may be configurable by an interface of the technical computing worker 270A-270N, or by a command line startup parameter, or an external configuration or registration file. The worker pool 668 may keep a list of "good" technical computing workers 270A-270N, or those workers to which the job manager 265 can communicate with and can determine has such a status to be available for processing tasks. The job manager 265 can update the worker pool 667 by going through the list of technical computing workers 270A-270N registered in the worker pool 667 and sending communications to each of the technical computing workers 270A-270N to determine their status and if they are available. Accordingly, the worker pool 667 can be updated to determine the current set of technical computing workers 667 available, or otherwise able to receive tasks from the job manager 265.

The job runner 667 is responsible for determining the next task to work on and for submitting the task to a technical computing worker 270A-270N. The job runner 667 works with the job queue 267 and takes the next task for processing from a job in the job queue 267. The job runner 667 obtains from the worker pool 668 a name of or reference to a technical computing worker 270A-270N and submits the task for processing to the obtained technical computing worker 270A-270N. The job runner 667 may be configured to have business rule logic to determine the next task to take from the job queue either in a FIFO manner supported by the job queue 267 or any other manner based on priority, availability, task and job option settings, user configuration, etc. The job runner 667 in conjunction with the worker pool 668 and the job queue 267 can form a portion of or all of the functionality of the automatic task distribution mechanism 260. The job runner 667 can have such logic to determine from the worker pool 668 which technical computing worker 270A-270N should be assigned and sent a task from the job queue 267. Alternatively, a separate automatic task distribution mechanism 260 can be responsible for determining the technical computing worker 270A-270N to be assigned a task and to send the task to the assigned technical computing worker 270A-270N. In any of these embodiments, the technical computing worker 250 does not need to know the identity, such as via a hostname or an internet protocol address, of the technical computing worker 270A-270N assigned to perform technical computing on a task.

The job manager 265 also has a database 669 for storing and retrieving job manager, job and task objects and data, or other objects and data to support the operations described herein. For example, jobs in the job queue 267, the list of workers of the worker pool 668, the tasks of any jobs in the job queue 267, the properties of any of the task, job or job manager objects may be stored in the database 669. The database 669 can be a relational database, or an object-oriented database, such as database software or applications from Oracle® or SQL Server from Microsoft®, or any other database capable of storing the type of data and objects supporting the operations described herein. The database 669 can be an in process database 669 of the job manager 265 or it can be a remote database 669 available on another computing device 102' or another server 260'. Furthermore, each instance of the job manager 265A-265N could use a different database and operating system than other instances of the job manager 265A-265N, or be using a local database while another job manager 265A-265N uses a remote database on another server 160'. One ordinarily skilled in the art will appreciate the various deployments of local or remote database access for each of the one or more job managers 265A-265N.

The job manager 265 can be configured to execute certain functions based on changes of the state of a job in the queue 267. For example, the technical computing client 250 can setup functions to be called when a job is created in a job queue 267, when the job is queued, when a job is running or when a job is finished. The job manager 265 is to call these functions when the appropriate change in the state of job occurs. In a similar manner, the task and job can be configured to call specified functions based on changes in state of the task or job. For example, a job may be configured to call a function when a job is added to the queue, when a task is created, when a task is completed, or when a task starts running. A task may be configured to call a function when the task is started, or running.

Referring still to FIG. 6C, the technical computing client 250 submits a job, Job1, comprised of one or more tasks, such as Task 1 and Task2, to the job manager 265. The job manager receives the job, e.g., job1, and places the job into a job queue 267. The job runner 667 then obtains the one or more tasks from the first job submitted to the job queue 267. A technical computing worker 270 registers with the job manager 265 and is listed in the worker pool 668 of the job manager 265. From the worker pool 668, the job runner 667 determines a technical computing worker 270A-270N to submit the task for processing. The technical computing worker 270A-270N obtains the function to be executed from the definition of the function in data structure of the task object, performs the function and generates a result of the function for the task. Then the technical computing worker 270 updates the task object to provide a result of the task. For example, the task object may have a field representing the output arguments from the execution of the function defined by the task. The output arguments may contain one or more arrays of data as allowed by the programming language of MATLAB®. Additionally, the task object may contain an error field to which the technical computing worker 270A-270N updated to indicate any error conditions in performing the task or executing the function of the task. The job manager 265 checks to see if this is the last result to be obtained from a technical computing worker 270A-270N for the job currently being processed. If the result is the last result, the job manager 265 can provide the set of task results for the completed job to the technical computing client 250.

Although the invention is generally discussed in terms of a job manager 265, automatic task distribution mechanism 260 and technical computing worker 250 as distributed software components available on various computing devices in the network, these software components can be operated as services in a service oriented distributed architecture. One embodiment of a service oriented technology approach is the use of Jini network technology from Sun Microsystems, Inc. Jini network technology, which includes JavaSpaces Technology and Jini extensible remote invocation, is an open architecture that enables the creation of network-centric services. Jini technology provides a method of distributed computing by having services advertise the availability of their provided service over a network for others to discover. Clients and other software components can discover the advertised services and then make remote method calls to the discovered services to access the functionality provided by the service. As such, the software components of the Distributed MATLAB® systems can be implemented as services which can be discovered and looked-up via advertising.

Figure 7:
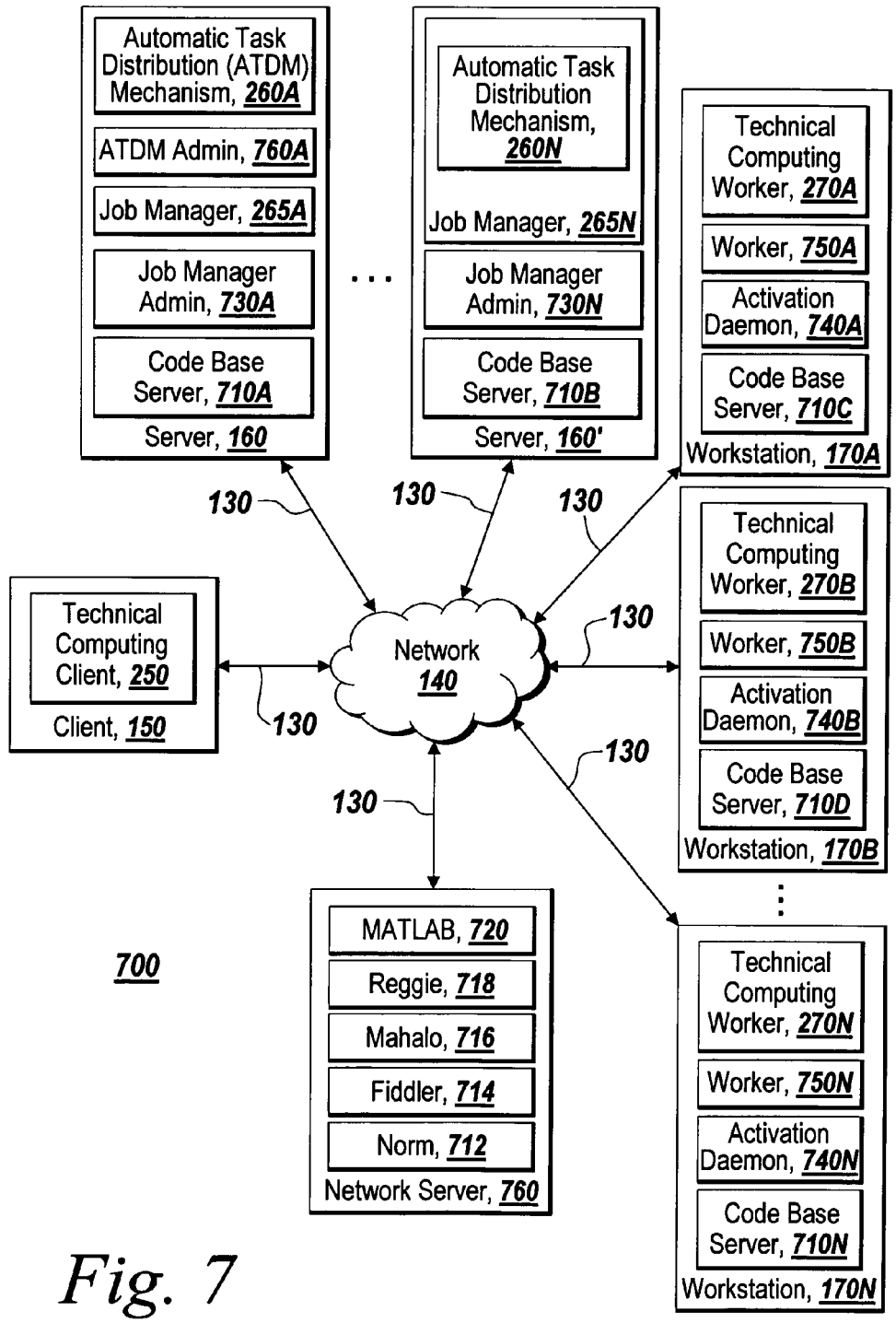
FIG. 7 is a block diagram depicting an exemplary embodiment of the invention using service processes.

Referring now to FIG. 7, an exemplary embodiment of the invention is shown implementing a service oriented approach with Jini network technology. In broad overview of the system 700, the technical computing client 250, technical computing workers 270A-270N, job managers 265A-265N, automatic task distribution mechanisms 260A-260N are in communication over the network 140 via network communication channels 130. Additionally there is a network server 760 in communication with the network 140 through the network communication channel 130. The network server 760 hosts a code base server 710. In an exemplary embodiment, the code base server 710 is an ftp server. In other embodiments, the code base server 710 is a web server, such as Java web server, or an http server. The code base server 710 is capable of and configured to upload files, including class or interface files. In an exemplary embodiment, the code base server 710 may upload JAR files. The code base server 710 may be available on the network 140 to Jini based services to obtain class files as a service on the network 140 may need, or it may be available to a technical computing client 250 to determine the interface to a service on the network 140.

In support of implementing software components of the present invention as Jini services, one or more of the following Jini services are available on the network server 760 on the network 140: Reggie 718, Mahalo 716, Fiddler 714 and Norm 712. These services are part of the Sun Technology Jini network technology implementation. Reggie 718 is a Jini service that provides service registration and discovery. This allows clients of a service to find the service on the network 140 without knowing the name of the computing device the service is running on. Mahalo 716 is a transaction manager service that provides fault tolerant transactions between services and clients of the service accessing the service. Fiddler 714 is a lookup discovery service. A Jini based service needs to register itself with an instance of Reggie in order to be discoverable on the network 140. The lookup discovery service of Fiddler 714 allows the service to find new Reggie services and register with them while inactive. Norm 712 is a lease renewal service. Services registered with Reggie are leased. When the lease on a registration expires, the service becomes unavailable from the instance of Reggie. Norm allows a Jini service to keep leases from expiring while the service is inactive. The services of Reggie, Mahalo, Fiddler and Norm can be run on any computing device 102 on the network 140 capable of running these services and can be run on a single java virtual machine (JVM).

Referring again to FIG. 7, the technical computing workers 270A-270N, which provide Distributed MATLAB® sessions, are made available as Jini Services to support the direct task distribution mode of operation of the invention. The technical computing workers 270A-270N register with a lookup service such as Reggie 718. This allows the technical computing workers 270A-270N to be discoverable on the network 140 by a technical computing client 250 without the technical computing client 250 knowing information like the host name of the workstations 170A-170N the technical computing workers 270A-270N are running on, or the port number to which a specific technical computing worker 270A-270N service is listening on, or a worker name associated with a technical computing worker 270A-270N.

The technical computing workers 270A-270N also support service activation with an activation daemon 740A-740N software component. Activation allows a technical computing worker service 270A-270N to register with an activation daemon 740A-740B to exit and become inactive, but still be available to a technical computing client 250. In all three distribution modes of operation as embodied in FIGS. 3A-3C, the MATLAB® technical computing workers 270A-270N can be activated by an activation daemon 740A-740N. This means that an activation daemon 740A-740N starts and stops the technical computing worker 270A-270N. For example, the technical computing worker 270A service registers with the activation daemon 740A on workstation 170A. The technical computing worker 270A includes the activation states of active, inactive and destroyed. In the active state, the technical computing worker 270A is started and is available for remote method calls from a technical computing client 250. The starting of the service and its availability for remote method calls, or an instance of a running of the service, may be referred to a session. In the inactive state, the technical computing client 250 is not started, but is still available for remote method calls from a technical computing client 250. If a remote method call to the technical computing worker service 270A is made by the technical computing client 250, the technical computing worker service 270A will be started by the activation daemon 740A, and the method call will be executed by the technical computing worker service 270A. In the destroyed state, the technical computing worker service 270A is not running and is not registered with the activation daemon 740A. In this state, the technical computing worker service 270A is not available for remote calls from a technical computing client 270. As such, the activation daemons 740A-740N provide persistence and maintain the state of the technical computing worker services 270A-270N.

The activation feature of technical computing worker services 270A-270N saves computing resources on workstations hosting the technical computing worker, and also increases service reliability. For example, if the technical computing worker service 270A terminates abruptly, the activation daemon 740A will automatically restart the next time a call is made to it. The activation daemon 740A-740N also provides for the graceful termination of the technical computing worker service 270A-270N. If an inactivate command is sent to a technical computing worker service 270A-270N, the technical computing worker service 270A-270N can complete the processing of outstanding method calls before terminating. Alternatively, a command can be sent to the technical computing worker 270A-270N to force immediate termination in the middle of processing a task. Additionally, in one embodiment, a technical computing worker 270A can be configured and controlled to shutdown after the completion of processing of a task. If the technical computing worker 270A is not shutdown, it can be further configured to keep the state of the technical computing environment, including any calculation or other workspace information, intact for the next task that may be processed.

In another embodiment of the technical computer worker service, the technical computing worker services 270A-270N can default to a non-debug mode when the technical computing worker service 270A-270N is started, either by the activation daemon 740A-740N or by other conventional means. Alternatively, the activation daemon 740A-740N and/or the technical computing worker service 270A-270N can be configured to start in debug mode, giving access to command line interface of the technical computing worker 270A-270N.

In a manner similar to technical computing worker services 270A-270N, the job managers 265A-265N and automatic task distribution mechanisms 260A-260N as depicted in FIG. 7 can also be implemented as services. As such, the job managers 265A-265N and automatic task distribution mechanisms 260A-260N can support lookup registration and discovery so that a technical computing client 250A can find the service without knowing the associated name of the service, the host name of the server 160 running the service, or the port name the service is listening on. Additionally, the job manager 265A-265N and automatic task distribution mechanism services 260A-260N can be supported by activation daemons as with the technical computing worker services 270A-270N.

In another aspect of the invention, the services of the technical computing worker 270A-270N, job manager 265A-265N and the automatic task distribution mechanism 260A-260N, can also have administration functions in addition to the operational functions discussed above. Administration functions may include such functionality as determining the current status of the service, or calling debug functions on the service, or manually calling specific methods available from the service. As depicted in FIG. 7, the technical computing workers 270A-270N may each include a technical computing worker administration software component 740A-740B, the job managers 265A-265N may each include a job manager administration software component 730A-730B, and the automatic task distribution mechanisms 260A-260N may also each include an administration software component 760A-760N. Any and each of these administration software components may be part of the respective service, or a separate software component, or another service in itself. Additionally, these administration software components may include a graphical user interface for easier administration of the service. From the graphical user interface, a user may be able to exercise a portion or all of the functionality provided by the administration component and/or the methods provided by the service. Any of these administration functions may be not be available to users of the technical computing client 250, and may be configured to only be available to system administrators or to those users with certain access rights to such functionality.

For example, the administration component 760A of the automatic task distribution mechanism 260A may provide a graphical view showing the tasks and results currently in the automatic task distribution mechanism. It may further show the movement of tasks and results in and out of the automatic task distribution mechanism along with the source and destinations of such tasks and results. Additionally, the graphical user interface may allow the user to set any of the properties and execute any of the methods described in the object-oriented interface to the object exchange repository 664, or space, as described in the user defined data classes below.

In another example, the job manager administration component 730A may provide a graphical view of all the jobs in the job queue 267 of the job manager 265. It may further show the status of the job and the state of execution of each of the tasks comprising the job. The graphical user interface may allow the user to control the jobs by adding, modifying or deleting jobs, or arranging the order of the job in the queue 267. Additionally, the graphical user interface may allow the user to set any of the properties and execute any of the methods described in the object-oriented interface to the job manager 266 as described in the user defined data classes below.

A graphical user interface to the technical computing worker administration component 750A-750N may provide a user the ability to change the activation state, stop and start, or debug the technical computing worker service 270A-270N. Additionally, the graphical user interface may allow the user to set any of the properties and execute any of the methods described in the object-oriented interface to the technical computer worker 270A-270N as described in the user defined data classes below.

Figure 8A:
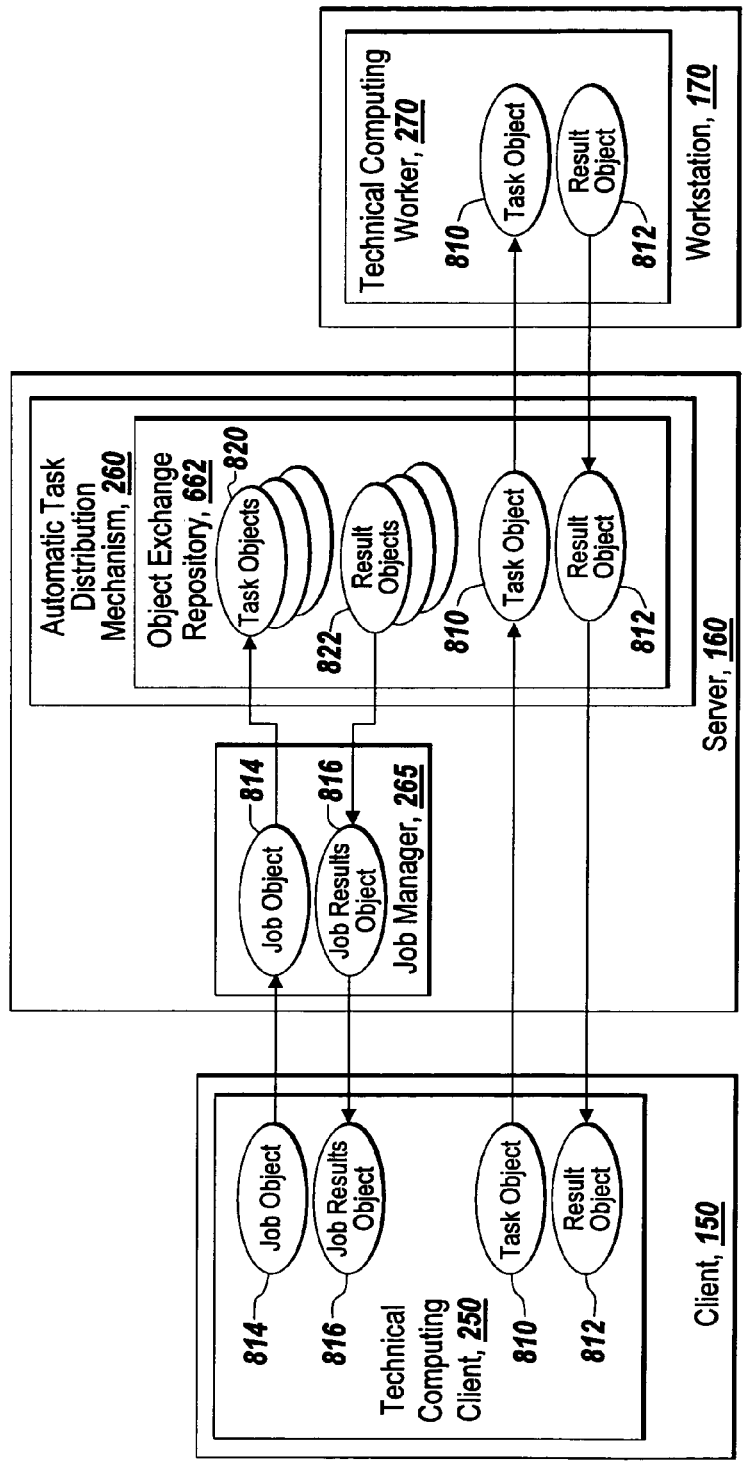
FIG. 8A is a block diagram illustrating the use of objects for user interaction with the distributed system.

Another aspect of this invention is the use of objects to perform object-oriented user interaction with the task and job management functionality of the distributed system. FIG. 8A depicts one embodiment of using user defined data classes as part of the Distributed MATLAB® programming language. In the object-oriented distributed system 800 embodiment of the present invention, the system 800 makes use of task objects 810, result objects 812, job objects 814 and jobresults objects 816 These objects present a lower level user interaction mechanism to interact with the task distribution functionality of the system 800.

In the object-oriented distributed system 800 of FIG. 8A, the technical computing client 250 creates or declares a task object 810. The task object 810 is a user defined data class containing a MATLAB® command, input data and number of arguments. The technical computing client 250 submits the task object, in the automated mode of operation, to the automatic task distribution mechanism 260, which stores the task object 810 in the object exchange repository 662. A technical computing worker 270 listening and waiting for a task object 810 to appear in the object exchange repository 662, takes the task object 810 to perform technical computing of the task. The technical computing worker 270 obtains the MATLAB® command and arguments from the properties of the task object 810 and performs technical computing on the task in accordance with the command. The technical computing worker 270 then creates or specifies a result object 812, which is a user defined data object containing the output data resulting from the execution of a task represented by a task object 810. The technical computing worker 270 then writes the result object 812 to the object exchange repository 662. The technical computing client 250 listens and waits for the appearance of the result object 812 in the object exchange repository 662. After the result object 812 appears in the object exchange repository, the technical computing client 250 takes the result object 812 from the object exchange repository and retrieves result information from the properties of the result object 812.

Referring still to FIG. 8A, in batch mode, the technical computing client 250 creates or declares a job object 814, which is a user defined data object containing an array of task objects 810. The technical computing client 250 then submits the job object 814 to the job manager 265 for processing. The job manager 265 then submits the one or more task objects 820 defined in the job object 814 to the object exchange repository 662 for processing by a technical computing worker 270. The technical computing worker 270 listening for the appearance of the task objects 820, takes the task objects 820 and performs technical computing on the function as defined by each task object. The technical computing worker 270 then generates results and creates or specifies the result objects 822 representing the output generated for each function of each of the task objects 820 of the job object 814. The technical computing worker 270 then writes the result objects 822 to the object exchange repository 662. The job manager 662 listening for the appearance of the result objects 822 takes the result objects from the object exchange repository 662. The job manager 265 then creates or specifies the jobresults object 816, which in an object that provides an array of result objects 844 for each task object defined in a job object 814. The job manager then provides the jobresults object 816 to the technical computing client 250. One ordinarily skilled in the art will recognize the various combinations of uses of each of these objects in performing the operation of the multiple modes of distribution as depicted in FIG. 4.

In an embodiment of the invention as depicted in FIG. 8A and by way of example, the following functions and properties are available in the programming language of Distributed MATLAB® via toolbox functionality of MATLAB® for task distribution management functionality:

| Task Properties | |
|---|---|
| Property Name | Property Description |
| TaskID | unique task identifier |
| JobID | non-null if this task is part of a job |
| FunctionNameAndParameters | name of function and parameters of function |
| NumberOfOutputArguments | number of output arguments of function |
| StartTime | startTime |

Methods

| Method Name | Method Description |
|---|---|
| evaluate | evaluates function and returns Result |

Result
Properties

| Property Name | Property Description |
|---|---|
| TaskID | unique identifier given to corresponding task object |
| JobID | non-null if this result is part of a job |
| OutputArguments | output arguments |
| StartTime | start time |
| EndTime | end time |
| WorkerName | name of work performing function |
| ErrorMessage | error message, if any |

Worker
Properties

| Property Name | Property Description |
|---|---|
| Name | assigned name of worker service |
| MachineName | name of computer worker service is running on |
| TaskCompletedFcn | called whenever the worker finishes a directly evaluated task |
| Admin | instance of WorkerAdmin class |

Methods

| Method Name | Method Description |
|---|---|
| evaluateTask | evaluate the function defined by instance of Task class |
| getResult | get instance of Result class generated by evaluatetask |

WorkerAdmin
Properties

| Property Name | Property Description |
|---|---|
| Worker | instance of Worker class |

Methods

| Method Name | Method Description |
|---|---|
| destroy | removes all traces of the MATLAB service |
| stop | unregisters the service but maintains files on disk |
| deactivate | stops the MATLAB process, but does not unregister service |
| activate | starts the MATLAB process |
| isActive | returns true if the MATLAB process is running |
| isBusy | returns true if MATLAB is processing task or otherwise busy |
| isProcessingTask | returns true if MATLAB is processing task |
| currentTask | returns the task being processed if idle, returns null |

Methods

| Method Name | Method Description |
|---|---|
| dbstop | basic debugging commands |
| dbstep | basic debugging commands |
| dbcont | basic debugging commands |
| break | sends Ctrl-C |
| isLogging | returns true if logging is turned on |
| log | L = 0 turns off logging L = 1 turns on logging |
| getStats | output arg format (return argument contents not yet determined) |
| clearResults | makes uncollected results available for garbage collection |
| listen | listen to the space for the appearance of task objects |
| getMachineProperties | return a structure of machine specific information (system load, processor speed, amount of memory, number of processors, etc) |

Space
Properties

| Property Name | Property Description |
|---|---|
| Name | name of space |
| MachineNme | host name of computer running the space |
| RsultAvailableFcn | name of function to call |
| SpaceAdmin | returns an instance of the SpaceAdmin class |

Methods

| Method Name | Method Description |
|---|---|
| putTask | the task will be written to the space |
| getTask | a task will be taken from the space. This will block until a task is found. If passed a null, a task with any TaskID will be returned. |
| getTaskIfAvailable | will return null if no task is immediately available |
| putResult | will place a result into the JavaSpace |
| getResult | works the same as gettask, except a result will be taken rather than a task. |
| getResultIfAvailable | will return null if no result with the corresponding TaskID is available |

SpaceAdmin
Properties

| Property Name | Property Description |
|---|---|
| Space | name of space |

Methods

| Method Name | Method Description |
|---|---|
| destroy | destroy the space |
| clearSpace | removes all entries in this space |
| cancelTask | removes the task or result matching TaskID from the space |
| numTasks | returns the number of tasks currently in the space |
| numTesults | returns the number of results currently in the space |
| workers | list MATLAB workers listening to space |

-continued

Methods

| Method Name | Method Description |
|---|---|
| clearWorkers | unregister all listening workers |
| addWorker | add a MATLAB worker as a listener |
| removeWorker | remove the given MATLAB worker |
| setEvalAttempts | set the number of times a task will be attempted |
| isLogging | returns true if logging is turned on |
| log | L = 0 turns off logging L = 1 turns on logging |
| getStats | output arg format (return argument contents not yet determined) |
| getTasks | removes and returns all tasks in the space in a cell array |
| getResults | removes and returns all results in the space in a cell array |
| readTasks | non-destructively returns all tasks in the space in a cell array |
| readResults | non-destructively returns all results in a cell array |

Job
Properties

| Property Name | Property Description |
|---|---|
| JobID | unique identifier for this job |
| Name | name of job |
| Tasks | cell array of task objects |
| UserName | name of user who creates job (user login name) |
| JobCompletedFcn | callback to execute when this job is finished |
| StartTime | start time of job |

Methods

| Method Name | Method Description |
|---|---|
| addTask | can add either a single task or a cell array of tasks |
| removeTask | can remove either a single task or a cell array of tasks |

JobResults
Properties

| Property Name | Property Description |
|---|---|
| JobID | unique identifier for job |
| Name | name of job |
| Username | name of user who created job |
| Results | cell array of result objects |
| StartTime | start time of job |
| EndTime | end time of job |

JobManager
Methods

| Method Name | Method Description |
|---|---|
| submitJob | submits a Job object to the job manager |
| getResults | returns a JobResults object. Will block until job is finished |
| getResultsIfAvailable | returns a JobResults object or null. Will return immediately |
| getResult | gets a result of instance of a task |
| getResultIfAvailable | get a result of instance of a task if result is available |

JobManagerAdmin
Properties

| Property Name | Property Description |
|---|---|
| JobManager | instance of JobManager class |
| Space | the space associated with this job manager |

Methods

| Method Name | Method Description |
|---|---|
| clearJobs | clears the job queue |
| promote | promotes the specified job |
| demote | demotes the specified job |
| promoteFirst | promote the job to the top of the queue |
| demoteLast | demote the job to the bottom of the queue |
| cancelJob | removes the job from the queue |
| getStatus | returns 'executing','completed',' |
| getInfo | gets information for all waiting jobs except for the task objects |
| readJobs | non-destructively returns all jobs in the queue |

The following methods are generally available methods in a package of the Distributed MATLAB programming environment, which in this exemplary embodiment have not been implemented as user defined data classes:

Package scope methods (not part of any class)

| | |
|---|---|
| findWorkers | finds MATLAB workers available on the network. Returns a cell array of worker objects. |
| findSpaces | finds spaces available on the network. Returns a cell array of space objects. |
| findJobManagers | finds jobmanagers available on the network. Returns a cell array of JobManager objects. |

The above package scope methods are used to find the services of technical computing workers 270A-270N, automatic task distribution mechanisms 260A-260N, or spaces, and job managers 265A-265N as depicted in FIG. 7. With these methods, a technical computing client 250 does not need to have previous knowledge of any technical computing worker 270A-270N, any of the automatic task distribution mechanisms 260A-260N or any job managers 265A-265N. The technical computing client 250 can use these methods to discover the name and number of such services available on the network 140.

In an embodiment of the present invention, the programming language of Distributed MATLAB® may support the three modes of operation as described with FIGS. 3A-3C. By way of example, the following program instructions show a programming usage of the above described user defined data classes for each of these modes of operation:

Direct Distribution Usage Example

```
% Find worker
w=distcomp.Worker('MachineName')
% Create task
t=distcomp.Task({'rand',10},1);
% (Optional) register completed callback for worker
w.TaskCompletedFcn='completedFcn';
% (Optional) set task timeout value
t.Timeout=10;
% Send task to worker
w.evaluateTask(t);
```

```
% Get result (could take place inside completed callback
function)
   r=w.getResult(t);
Automated Distribution Usage Example
   % Find space
   s=distcomp.Space('spacename')
   % Create task
   t=distcomp.Task({'rand',10},1)
   % (Optional) Register completed callback for space
   s.TaskCompletedFcn='completedFcn';
   % (Optional) set task timeout value
   t.timeout=10;
   % Put task in space
   s.putTask(t);
   % Get result from space (could be inside result listener)
   r=s.getResult(t);
Batch Processing Usage Example
   % Find Job Manager
   jm=distcomp.JobManager('managername')
   % Create job
   j=distcomp.Job('username','jobname')
   % (optional) register callback for job completion
   j.JobCompletedFcn='callbackFcn';
   % Add tasks to job
   for(i=1:10)
   t=distcomp.Task({'rand',10},1);
   % (optional) register completed callback for task
   t.CompletedFcn='callbackFcn';
   % (optional) set task timeout value
   t.Timeout=10;
   j.addTask(t);
   end
   jm.submit(j)
   % Get results from job manager
   for(i=1:10)
   r=jm.getResult(j.Tasks{i});
   % insert code to process result here
   end
```

In addition to the object-oriented interface to task and job management functionality of the distributed system, the programming language of Distributed MATLAB® may also support task distribution via high-level functional procedure calls. The MATLAB® programming language includes procedural function calls such as eval( ) and feval( ) that provide a quick and powerful procedure to execute functions. Also, the MATLAB® programming enables you to write a series of MATLAB® statements into a file, referred to as an M-File, and then execute the statements in the file with a single command. M-files can be scripts that simply execute a series of MATLAB® statements, or they can be functions that also accept input arguments and produce output. Additionally, the MATLAB® programming language supports anonymous functions and function handles. Function handles are useful when you want to pass your function in a call to some other function when that function call will execute in a different workspace context than when it was created. Anonymous functions give you a quick means of creating simple functions without having to create M-files each time and can be viewed as a special subset of function handles. An anonymous function can be created either at the MATLAB® command line or in any M-file function or script. Anonymous functions also provide access to any MATLAB® function. The @ sign is the MATLAB® operator that constructs a function handle or an anonymous function, which gives you a means of invoking the function. Furthermore, the MATLAB® programming language enables the association of a callback function with a specific event by setting the value of the appropriate callback property. A variable name, function handle, cell array or string can be specified as the value of the callback property. The callback properties for objects associated with Distributed MATLAB® are designed to accept any of the above described configurations as the value of the callback property, and may accept any other command, function or input parameter value that are or may become available in the MATLAB® programming language. This allows users of the MATLAB® programming language to use the function calls they are familiar with, without learning the object-oriented mechanism, and take advantage of the distributed processing of tasks offered by Distributed MATLAB® of the present invention.

Figure 8B:
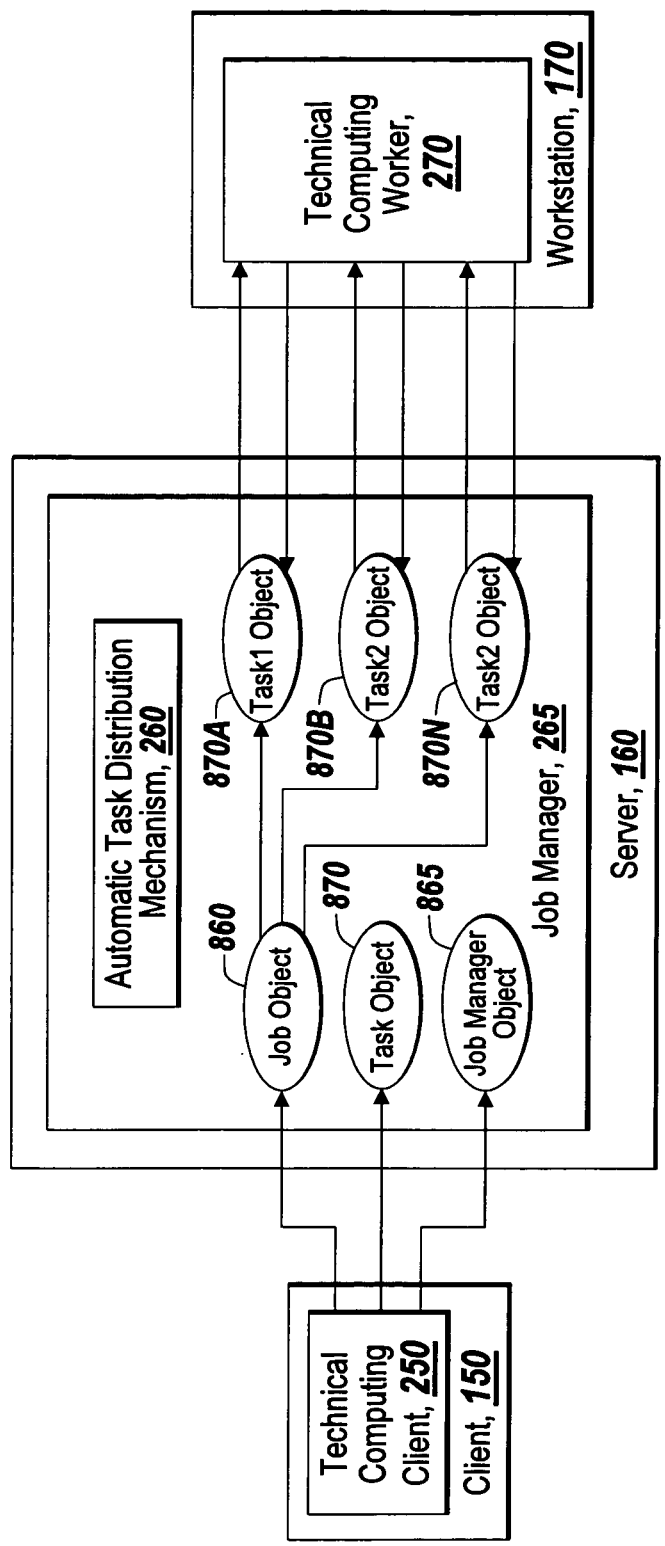
FIG. 8B is a block diagram illustrating the use of objects for user interaction with an exemplary embodiment of the distributed system.

In the exemplary object-oriented distributed system 805 of FIG. 8B, the technical computing client 250 creates or declares a job object 860 residing in the job manager 265. The job object comprises one or more task objects 870A-870N. The job object 860 further defines properties associated with the job, such as those job properties described in further detail below. For example, a timeout property to specify the time limit for completion of a job. Additionally, the minimum and maximum number of technical computing workers to perform the tasks of the job can be set. The task object 870A-870N is an object that defines a function to be executed by a technical computing worker 270. The function contains a MATLAB® command, input data and number of arguments. The task object 870A-870N defines additional task properties, such as those defined below. For example, the task object 870A-870N may have a state property to indicate the current state of the task. Additionally, the technical computing client 250 may interface with the job manager 265 through a job manager object 865 residing on the job manager 265. In a similar manner to the job object 860 and task objects 870A-870N, the job manager object 865 may have properties to define configuration and other details about the job manager 265 as described below. For example, the job manager object 865 may have a hostname property to indicate the name of the computer where a job queue exists, or a hostaddress property to indicate the interne protocol address of the computer. For any of the job manager object 865, job object 860 or task objects 870A-870N, the technical computing client may not instantiate a local object but may just have a proxy or facade object to reference the object existing in the job manager 265.

Still referring to FIG. 8B, the technical computing client 250 submits the job to the job manager 265 via the job object 865. The job manager 265 obtains each of the task objects 870A-870N from the job object 865. The job manager puts the job of the job object 860 into the job queue 267. The job runner 667 obtains the one or more task objects 870A-870N from the job object 860. The job runner 667 with the worker pool 668 determines a technical computing worker 270 to process a task. The job runner 667 then submits a task, via a task object 870A-870N to an assigned technical computing worker 270. The technical computing worker 270 obtains the function to execute from the properties of the task object 870A-870N and performs technical computing of the task in accordance with the function. The technical computing worker 270 then obtains the results of the function and updates one or more properties of the task object 870A-870N with information about the results. In the case of any errors, the technical computing worker 270 may update any error properties of the task object 870A-870N. In a similar manner as the technical computing client 250, the technical computing worker 270 may use proxy or facade objects to interface with the job 860, job manager 865 or task 870A-870N objects residing in the job manager 265. The job manager 265 then updates the job object 860 with updated task objects 870A-

870N containing the results of each task. The job manager 265 may also update other properties of the job object 860, such as start and finish times of the job, to reflect other information or status of the job. The job manager 265 then provides the updated job object 860 to the technical computing client 250. The technical computing client 250 then can retrieve the results of each task from the updated job object 860. One ordinarily skilled in the art will recognize the various combinations of uses of the properties and functions of these objects in performing the operations described herein and in support of any of the multiple modes of distribution as depicted in FIG. 4.

In an exemplary embodiment of the invention as depicted in FIG. 8B and by way of example, the following functions and properties may be available in the programming language of Distributed MATLAB® for creating and handling objects related to the task distribution and management functionality of the present invention:

| Function Reference createJob | |
|---|---|
| Purpose | Create a job object |
| Syntax | obj = createJob(jobmanager) |
| | obj = createJob( . . . , 'p1', v1, 'p2', v2, . . . ) |
| Arguments | obj          The job object. |
| | jobmanager   The job manager object representing the job manager service that will execute the job. |
| | p1, p2      Object properties configured at object creation. |
| | v1, v2      Initial values for corresponding object properties. |
| Description | obj = createJob(jobmanager) creates a job object at the specified remote location. In this case, future modifications to the job object result in a remote call to the job manager. |
| | obj = createJob( . . . , 'p1', v1, 'p2', v2, . . . ) creates a job object with the specified property values. If an invalid property name or property value is specified, the object will not be created. |
| | Note that the property value pairs can be in any format supported by the set function, i.e., param-value string pairs, structures, and param-value cell array pairs. |
| Example | % construct a job object. |
| | jm = findResource('jobmanager'); |
| | obj = createJob(jm, 'Name', 'testjob'); |
| | % add tasks to the job. |
| | for i = 1:10 |
| | createTask(obj, 'rand', {10}); |
| | end |
| | % run the job. |
| | submit(obj); |
| | % retrieve job results. |
| | out = getAllOutputArguments(obj); |
| | % display the random matrix. |
| | disp(out{1}{1}); |
| | % destroy the job. |
| | destroy(obj); |
| createTask | |
| Purpose | Create a new task in a job |
| Syntax | obj = createTask(j, functionhandle, numoutputargs, inputargs) |
| | obj = createTask( . . . , 'p1', v1, 'p2', v2, . . . ) |
| Arguments | j            The job that the task object is created in. |
| | functionhandle   A handle to the function that is called when the task is evaluated. |
| | numoutputargs   The number of output arguments to be returned from execution of the task function. |
| | inputargs      A row cell array specifying the input arguments to be passed to the function functionhandle. Each element in the cell array will be passed as a separate input argument. |
| | p1, p2      Task object properties configured at object creation. |
| | v1, v2      Initial values for corresponding task object properties. |
| Description | obj = createTask(j, functionhandle, numoutputargs, inputargs) creates a new task object in job j, and returns a reference, obj, to the added task object. |
| | obj = createTask( . . . , 'p1',v1,'p2',v2, . . . ) adds a task object with the specified property values. If an invalid property name or property value is specified, the object will not be created. |
| | Note that the property value pairs can be in any format supported by the set function, i.e., param-value string pairs, structures, and param-value cell array pairs. |
| Example | % create a job object. |
| | jm = findResource('jobmanager'); |
| | j = createJob(jm); |
| | % add a task object to be evaluated that generates a 10 × 10 random matrix. |
| | obj = createTask(j, @rand, {10, 10}); |
| | % run the job. |
| | submit(j); |
| | % get the output from the task evaluation. |
| | taskoutput = get(obj, 'OutputArguments'); |

-continued

|  |  |
|---|---|
|  | % show the 10 × 10 random matrix.<br>disp(taskoutput{1}); |
| destroy |  |
| Purpose | Remove a job or task object from its parent and from memory |
| Syntax | Destroy(obj) |
| Arguments | obj    Job or task object deleted from memory. |
| Description | destroy(obj) removes the job object reference or task object reference obj from the local session, and removes the object from the job manager memory. When obj is destroyed, it becomes an invalid object. An invalid object should be removed from the workspace with the clear command. If multiple references to an object exist in the workspace, destroying one reference to that object invalidates the remaining references to it. These remaining references should be cleared from the workspace with the clear command. The task objects contained in a job will also be destroyed when a job object is destroyed. This means that any references to those task objects will also be invalid. If obj is an array of job objects and one of the objects cannot be destroyed, the remaining objects in the array will be destroyed and a warning will be returned. |
| Remarks | Because its data is lost when you destroy an object, destroy should be used after output data has been retrieved from a job object. |
| Example | % destroy a job and its tasks.<br>jm = findResource('jobmanager');<br>j = createJob(jm, 'Name', 'myjob');<br>t = createTask(j, @rand, {10});<br>destroy(j);<br>clear j<br>Note that task t is also destroyed as part of job j. |
| destroyAllTasks |  |
| Purpose | Remove all of a job's tasks from the job object and from memory |
| Syntax | destroyAllTasks(obj) |
| Arguments | obj    Job object whose tasks are deleted. |
| Description | destroyAllTasks(obj) removes all tasks from the job object obj. The job itself remains, and you can add more tasks to it. (By comparison, using destroy on the job removes the job object entirely.) |
| findJob |  |
| Purpose | Find job objects stored in a job manager |
| Syntax | findJob(jm)<br>out = findJob(jm)<br>[pending queued running finished] = findJob(jm)<br>out = findJob(jm, 'p1', v1, 'p2', v2, . . . ) |
| Arguments | jm    Job manager object in which to find the job.<br>pending      Array of jobs in job manager jm whose State is pending.<br>queued      Array of jobs in job manager jm whose State is queud.<br>running      Array of jobs in job manager jm whose State is running.<br>finished      Array of jobs in job manager jm whose State is finished.<br>out      Array of jobs found in job manager jm.<br>p1, p2      Job object properties to match.<br>v1, v2      Values for corresponding object properties. |
| Description | findJob(jm) prints a list of all of the job objects stored in the job manager jm. Job objects will be categorized by their State property and job objects in the 'queued' state will be displayed in the order in which they are queued, with the next job to execute at the top (first). out = findJob(jm) returns an array, out, of all job objects stored in the job manager jm. Jobs in the array will be ordered by State in the following order: 'pending', 'queued', 'running', 'finished'; within the 'queued' state, jobs are listed in the order in which they are queued. [pending queued running finished] = findJob(jq) returns arrays of all job objects stored in the job manager jm, by state. Jobs in the array queued will be in the order in which they are queued, with the job at queued(1) being the next to execute. out = findJob(jm, 'p1', v1, 'p2', v2, . . . ) returns an array, out, of job objects whose property names and property values match those passed as parameter-value pairs, p1, v1, p2, v2. Note that the property value pairs can be in any format supported by the get function, i.e., param-value string pairs, structures, and param-value cell arraypairs. If a structure is used, the structure field names are job object property names and the field values are the requested property values. Jobs in the queued state are returned in the same order as they appear in the job queue service. When a property value is specified, it must use the same format that the get function returns. For example, if get returns the Name property value as MyJob, then findJob will not find that object while searching for a Name property value of myjob. |
| findResource |  |
| Purpose | Find available Distributed MATLAB resources |
| Syntax | findResource('type')<br>out = findResource('type')<br>out = findResource('type', 'p1', v1, 'p2', v2, . . . ) |
| Arguments | out      Object or array of objects returned.<br>p1, p2      Object properties to match.<br>v1, v2      Values for corresponding object properties. |

-continued

| | |
|---|---|
| Description | findResource('type') displays a list of all the available Distributed MATLAB resources of type given by the string type, that have the ability to run a job. Possible types include 'jobmanager', localsession', 'mlworker'. out = findResource('type') returns an array, out, containing objects representing all available Distributed MATLAB resources of the given type. out = findResource('type', 'p1', v1, 'p2', v2, . . . ) returns an array, out, of resources of the given type whose property names and property values match those passed as parameter-value pairs, p1, v1, p2, v2. Note that the property value pairs can be in any format supported by the get function, i.e., param-value string pairs, structures, and param-value cell array pairs. If a structure is used, the structure field names are object property names and the field values are the requested property values. When a property value is specified, it must use the same format that the get function returns. For example, if get returns the Name property value as MyJobManager, then findResource will not find that object while searching for a Name property value of myjobmanager. |
| Remarks | The only supported types of resources is jobmanager. Note that some parameter-value pairs are queried on the local machine, while others require a call directly to the job manager to query. The parameter-value pairs that require a call to the job manager will take longer to query than those<br>'type' Type of resource to find that can be queried locally. The properties that are known locally are: Type, Name, HostName, and Address. Note that it is permissible to use parameter-value string pairs, structures, and parameter-value cell array pairs in the same call to findResource. |
| Example | jm1 = findResource('jobmanager', 'Name', 'jobmanager1name');<br>jm2 = findResource('jobmanager', 'Name', 'jobmanager2name'); |
| findTask | |
| Purpose | Get the task objects belonging to a job object |
| Syntax | tasks = findTask(obj)<br>tasks = findTask(obj, range)<br>tasks = findTask(obj, 'p1', v1, 'p,2', v2, . . . ) |
| Arguments | obj        Job object.<br>range    A scalar or vector list of indexes specifying which tasks to return. tasks returned task objects.<br>p1, p2    Task object properties to match.<br>v1, v2    Values for corresponding object properties. |
| Description | tasks = findTask(obj) and tasks = findTask(obj, range) get tasks belonging to a job object obj, where range is a scalar or vector list of indexes specifying which tasks to return. tasks = findTask(obj, 'p1', v1, 'p2', v2, . . . ) gets a 1xN array of task objects belonging to a job object obj. The returned task objects will be only those having the specified property-value pairs. Note that the property value pairs can be in any format supported by the get function, i.e., param-value string pairs, structures, and param-value cell array pairs. If a structure is used, the structure field names are object property names and the field values are the requested property values. When a property value is specified, it must use the same format that the get function returns. For example, if get returns the Name property value as MyTask, then findTask will not find that object while searching for a Name property value of mytask. |
| Remarks | If obj is contained in a remote service, findTask will result in a call to the remote service. This could result in findTask taking a long time to complete, depending on the number of tasks retrieved and the network speed. Also, if the remote service is no longer available, an error will be thrown.<br>If obj is contained in a remote service, you can issue a $\hat{\ }$C (Control-C) while findTask is blocking. This returns control to MATLAB. In this case, another remote call will be necessary to get the data. |
| Example | % create a job object.<br>jm = findResource('jobmanager');<br>obj = createJob(jm);<br>% add a task to the job object.<br>createTask(obj, @rand, {10})<br>% assign to t the task we just added to obj.<br>t = findTask(obj, 1) |
| getAllOutputArguments | |
| Purpose | Retrieve output arguments from evaluation of all tasks in a job object |
| Syntax | data = getAllOutputArguments(obj) |
| Arguments | obj    Job object whose tasks generate output arguments.<br>data    Cell array of job results. |
| Description | data = getAllOutputArguments(obj) returns data, the output data contained in the tasks of a finished job. Each element of the 1xN cell array data contains the output arguments for the corresponding task in the job, that is, each element is a cell array. If no output data is returned for a task, then that element will contain an empty cell array as a placeholder. The order of the elements in data will be the same as the order of the tasks contained in the job. |
| Remarks | Because getAllOutputArguments results in a call to a remote service, it could take a long time to complete, depending on the amount of data being retrieved and the network speed. Also, if the remote service is no longer available, an error will be thrown. You can issue a $\hat{\ }$C (control-C) while getAllOutputArguments is blocking. This does not stop the data retrieval, but returns control to MATLAB. In this case, another remote call is necessary to get the data. Note that issuing a call |

-continued

| | |
|---|---|
| Example | to getAllOutputArguments will not remove the output data from the location where it is stored. To remove the output data, use the destroy function to remove either the task or its parent job object, or use destroyAllTasks.<br>jm = findResource('jobmanager');<br>j = createJob(jm, 'Name', 'myjob');<br>t = createTask(j, @rand, {10});<br>submit(j);<br>data = getAllOutputArguments(t);<br>% display a 10 × 10 random matrix<br>disp(data{1});<br>destroy(j); | submit

| | |
|---|---|
| Purpose | Queue a job in a job queue service |
| Syntax | submit(obj) |
| Arguments | obj    Job object to be queued. |
| Description | submit(obj) queues the job object, obj, in the resource where it currently resides. The resource where a job queue resides is determined by how the job was created. A job may reside in the local MATLAB session, in a remote job manager service, or in a remote MATLAB worker service. If submit is called with no output arguments, then it is called asynchronously, that is, the call to submit returns before the job is finished. An exception to this rule is if the job resides in the local MATLAB session, in which case the submit always executes synchronously. |
| Remarks | When a job contained in a job manager is submitted, the job's State property is set to queued, and the job is added to the list of jobs waiting to be executed by the job queue service. The jobs in the waiting list will be executed in a first in, first out manner, that is, the order in which they were submitted. |
| Example | % find a job manager service named jobmanager1.<br>jm1 = findResource('jobmanager', 'Name', 'jobmanager1');<br>% create a job object.<br>j1 = createJob(jm1);<br>% add a task object to be evaluated for the job.<br>t1 = createTask(j1, @myfunction, {10, 10});<br>% queue the job object in the job manager.<br>submit(j1); |

PropertyReference
JobManager Object Properties

| Property Name | Property Description |
|---|---|
| HostName | Indicate name of the machine where a job queue exists |
| HostAddress | Indicate the IP address of the host machine where a job queue exists |
| ID | Indicate a job manager object's identifier |
| JobCreatedFcn | Specify the M file function to execute when a job is created in a job queue |
| JobFinishedFcn | Specify the M file function to execute when jobs finish in a job queue |
| JobQueuedFcn | Specify the M file function to execute when jobs are queued |
| JobRunningFcn | Specify the M file function to execute when job are run in a job queue |
| Jobs | Indicate the jobs contained in a job manager |
| Name | Indicate the name of the job manager |
| State | Indicate the current state of the job manager |

-continued

JobObject Properties

| Property Name | Property Description |
|---|---|
| QueuedFcn | Specify M file function to execute when job added to queue |
| RestartWorker | Specify whether to restart MATLAB on a worker before it evaluates a task |
| RunningFcn | Specify the M file function to execute when a job or task starts running |
| StartTime | Indicate when a job started running |
| State | Indicate the current state of a job object |
| TaskCreatedFcn | Specify the M file function to execute when a task is created |
| TaskFinishedFcn | Specify the M file function to execute when tasks finish in job queue |
| TaskRunningFcn | Specify M file function to execute when a task is run |
| Tasks | Indicate the tasks contained in a job object |
| Timeout | Specify time limit for completion of a job |

JobObject Properties

| Property Name | Property Description |
|---|---|
| FinishedFcn | Specify the callback to execute when a job finishes running |
| FinishTime | Indicate when a job finished |
| ID | Indicate a job object's identifier |
| MaximumNumberOfWorkers | Specify maximum number of workers to perform the tasks of a job |
| MinimumNumberOfWorkers | Specify minimum number of workers to perform the tasks of a job |
| Name | Specify a name for a job object |

Task Object Properties

| Property Name | Property Description |
|---|---|
| CaptureCommandWindowOutput | Specify whether to return command window output |
| CommandWindowOutput | Indicate text produced by execution of task object's function |
| ErrorID | Indicate task error identifier |
| ErrorMessage | Indicate output message from task error |
| FinishedFcn | Specify the callback to execute when a task finishes running |
| FinishTime | Indicate when a task finished |

-continued

| Task Object Properties | |
|---|---|
| Property Name | Property Description |
| Function | Indicate the function called when evaluating a task |
| ID | Indicate a task object's identifier |
| InputArguments | Indicate the input arguments to the task object |
| NumberOfOutputArguments | Indicate the number of arguments returned by the task function |
| OutputArguments | The data returned from the execution of the task |
| RunningFcn | Specify the M file function to execute when a job or task starts running |
| State | Indicate the current state of a task object |
| StartTime | Indicate when a task started running |
| Timeout | Specify time limit for completion of a task |

In alternative embodiments, the object-oriented interfaces and/or functional procedures available in the Distributed MATLAB® programming language, may be available in one or more application programming interfaces, and may be available in one or more libraries, software components, scripting languages or other forms of software allowing for the operation of such object-oriented interfaces and functional procedures. One ordinarily skilled in the art will appreciate the various alternative embodiments of the above class definitions, class method and properties, package scope methods, functional procedures and programming instructions that may be applied to manage the distribution of tasks and jobs for distributed technical computing processing of the present invention.

Figure 9A:
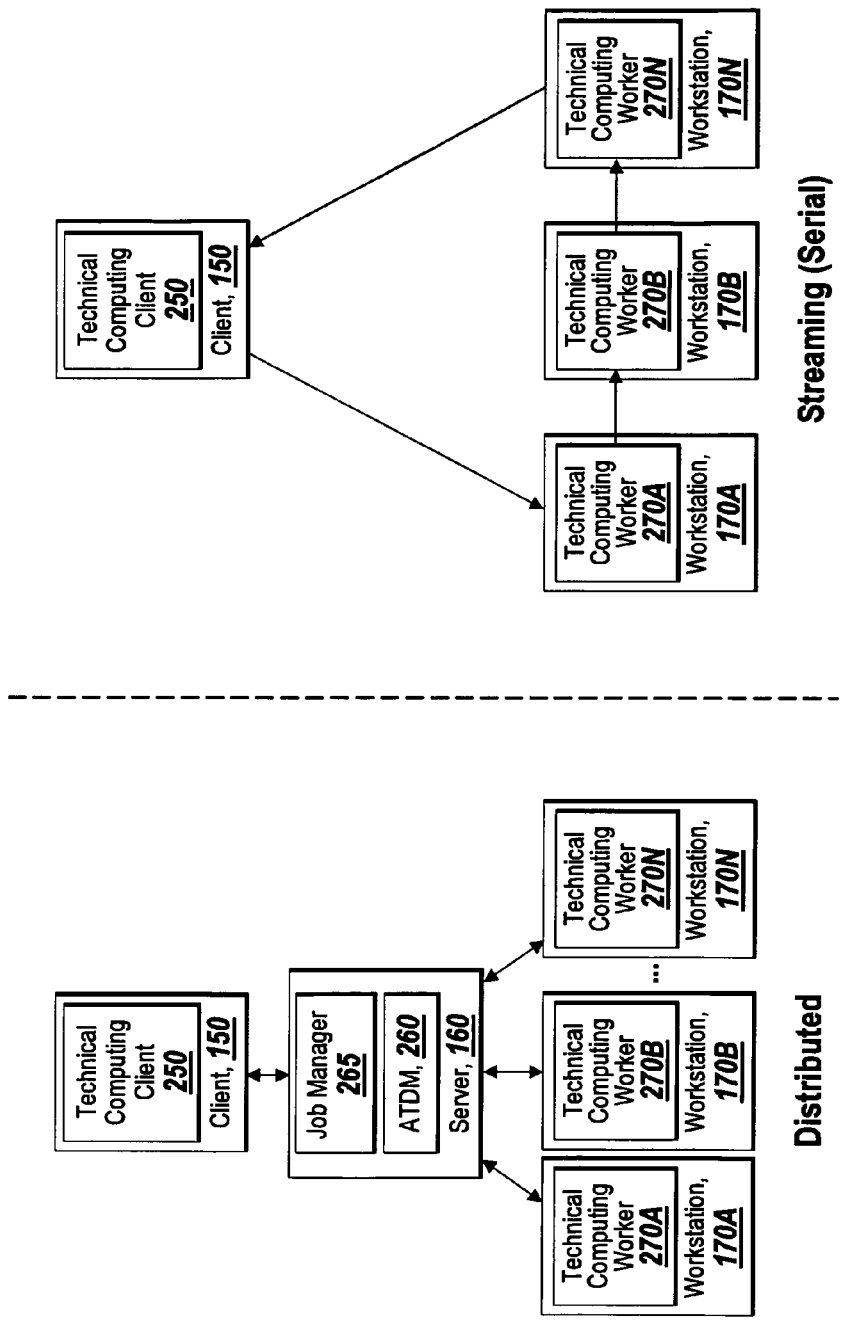
FIG. 9A is a block diagram illustrating an operation of the present invention for distributed and streaming technical computing.
Figure 9B:
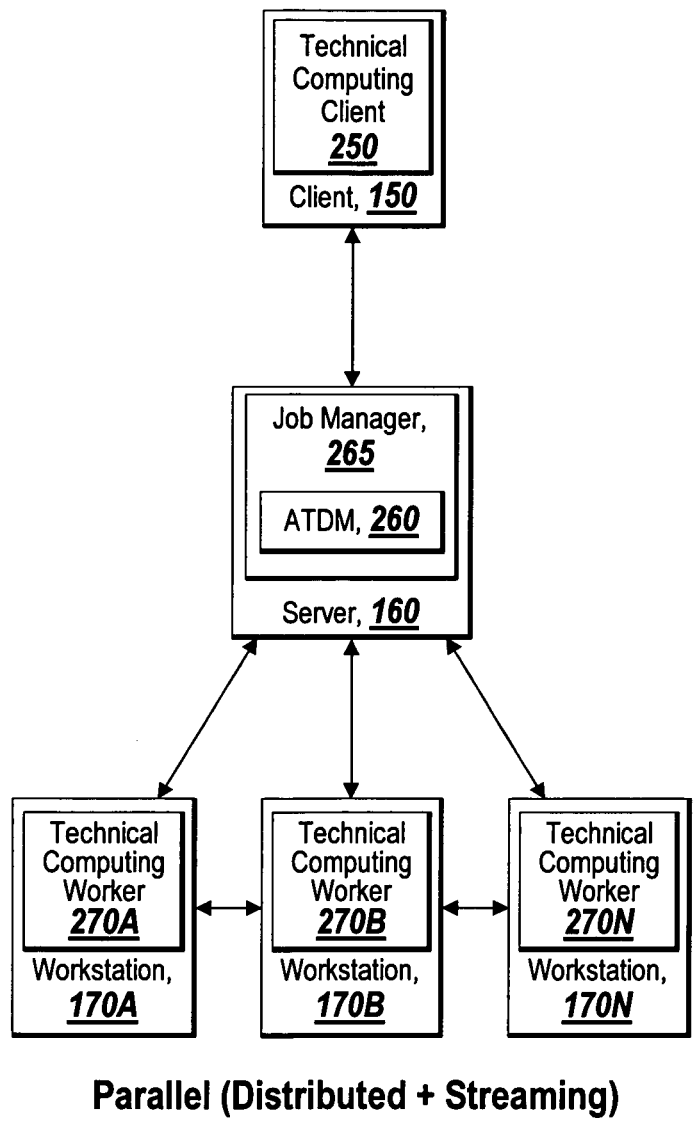
FIG. 9B is a block diagram illustrating an operation of the present invention for parallel technical computing.

From an overall perspective and in view of the structure, functions and operation of Distributed MATLAB® as described herein, the current invention presents many advantages for distributed, streaming and parallel technical computing processing systems as depicted in FIGS. 9A and 9B. The Distributed MATLAB® system can handle a wide variety of user configurations from a standalone system to a network of two machines to a network of hundreds of machines, and from a small task granularity to an extremely large task granularity of parallel, and parallel and serial technical computing.

Referring to FIG. 9A, the distributed system 910 supports the delegation of tasks from a technical computing client 250 to remote technical computing workers 270A-270N leveraging the processing capability of each of the workstations 170A-170N hosting each of the technical computing workers 270A-270N. The tasks are executed independently of each other and do not require the technical computing workers 270A-270B to communicate with each other.

Still referring to FIG. 9A, the streaming, or serial, processing system 910 allows serial processing to occur via multiple technical computing workers 270A-270N on multiple workstations 170A-170N. A technical computing client 250A submits a job requiring a task to be processed serially from technical computing worker 270A to technical computing worker 270B then to technical computing worker 270N. When technical computing worker 270A completes its technical computing of the task, technical computing worker 270A submits the task to technical computing worker 270B for further processing. In a similar fashion, the task can be submitted to additional technical computing workers 270N for further processing until the task is complete in accordance with its task definition. The last technical computing worker 270N to perform technical computing on the task submits the result to the technical computing client 250.

The streaming processing system 920 can take advantage of specific workstations 170A-170N that may have faster processors for performing processor intensive portions of technical computing of the task or take advantage of technical computing workers 270A-270N with access to specific data sets or external control instrumentation as required for computation of the task.

In FIG. 9B, a parallel system 930 is depicted which combines the distributed and streaming configuration of the systems (900 and 910) in FIG. 9A. In brief overview, technical computing workers 270A and 270B and 270N can be executing a set of tasks independently of each other. Additionally, these technical computing workers can then submit tasks to other technical computing workers to perform technical computing of a task in a streaming fashion. For example, technical computing worker 270A can submit a task for further processing to technical computing worker 270B, and in turn, technical computing worker 270B can submit the task for further processing by technical computing worker 270N. The technical computing worker 270N when it completes processing may return a result back to the automatic task distribution mechanism 260 or the technical computing client 250. This configuration provides for great flexibility in determining how to best distribute technical computing tasks for processing based on many factors such as the types and availability of computing devices, network topology, and the nature and complexity of the technical computing problem being solved.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method comprising:
submitting a task, associated with a job, to a first device, the submitting being performed by a first technical computing device,
the task causing the first device to submit the task to a second device to cause the second device to:
make the task available; and
register the task with a second technical computing device, the second technical computing device generating a result based on the second technical computing device performing an operation associated with the task;
registering one or more callbacks, associated with the task, with the first device, the registering the one or more callbacks being performed by the first technical computing device, the one or more callbacks being to:
dynamically update the first technical computing device when an execution status of the second technical computing device changes, the execution status being associated with the operation associated with the task, the registering the one or more callbacks causing:
the first device to:
transmit a request to the second device to receive a notification of the generated result of the task, and transmit the notification of the generated result of the task to the first technical computing device; and the second device to:

register, based on the transmitted request, the notification with the second technical computing device;

receiving, based on the task, a dynamic update, the receiving being performed by the first technical computing device, the dynamic update being received from the second device when one of the registered one or more callbacks is triggered based on the change in the execution status of the second technical computing device;

receiving information regarding the change in the execution status of the second technical computing device based on the received dynamic update, the receiving the information being performed by the first technical computing device; and obtaining the generated result of the task, the obtaining being performed by the first technical computing device, and the generated result being:

received by the first device from the second device, and transmitted, by the first device and based on receiving the generated result from the second device, to the first technical computing device.

2. The method of claim 1, where, when obtaining the generated result of the task, the method includes:

receiving a notification from the first device that the job, associated with the task, is complete; and obtaining the generated result of the task from the first device after receiving the notification from the first device.

3. The method of claim 2, where, when receiving the notification, the method includes:

receiving the notification from the first device using a registered callback of the one or more registered callbacks.

4. The method of claim 1, where, when submitting the task to the first device, the method includes:

submitting, by the first technical computing device, the job to the first device, the job being associated with the task and one or more other tasks.

5. A method comprising:

receiving a task, associated with a job, for execution, the receiving being performed by a first device, the execution occurring in a technical computing environment, the task being received from a first technical computing device;

submitting the task to a second device, the submitting being performed by the first device, the submitting causing the second device to:

make the task available;

register the task with a second technical computing device, the second technical computing device generating a result based on the second technical computing device performing an operation associated with the task;

receiving a request to register a callback, associated with the task, with the first technical computing device, the receiving the request being performed by the first device, the request being received from the first technical computing device, the callback being to:

dynamically update the first technical computing device when an execution status of the second technical computing device changes, the execution status being associated with the operation associated with the task;

transmitting, based on receiving the request to register the callback, a request to the second device to receive a notification of the generated result of the task, the transmitting the request being performed by the first device, the transmitted request causing the second device to:

register the notification with the second technical computing device;

transmitting the notification of the generated result of the task to the first technical computing device, the transmitting the notification being performed by the first device;

transmitting, based on the task, a dynamic update, the transmitting the dynamic update being performed by the first device, the dynamic update being received from the second device when the registered callback is triggered based on the change in the execution status of the second technical computing device;

obtaining the generated result of the task, the obtaining being performed by the first device, and the generated result being received from the second device; and transmitting, based on receiving the generated result from the second device, the generated result to the first technical computing device, the transmitting the generated result being performed by the first device.

6. The method of claim 5, where, when transmitting the generated result, the method includes:

transmitting a notification that the job, associated with the task, is complete.

7. The method of claim 6, where, when transmitting the notification, the method includes:

transmitting the notification that the job is complete using the callback.

8. The method of claim 5, where, when receiving the task, the method includes:

receiving the job, the job being associated with the task and one or more other tasks.

9. A first technical computing device comprising:

a memory to store instructions; and a processor to execute the instructions to:

submit a task, associated with a job, to a first device, the task causing the first device to submit the task to a second device to cause the second device to:

make the task available; and register the task with a second technical computing device, the second technical computing device generating a result based on the second technical computing device performing an operation associated with the task;

register one or more callbacks, associated with the task, with the first device, the one or more callbacks being to:

dynamically update the first technical computing device when an execution status of the second technical computing device changes, the execution status being associated with the operation associated with the task, and the processor, when registering the one or more callbacks with the first device, being to:

cause the first device to:

transmit a request to the second device to receive a notification of the generated result of the task; and transmit the notification of the generated result of the task to the first technical computing device; and cause the second device to:
register, based on the transmitted request, the notification with the second technical computing device;
receive, based on the task, a dynamic update, the dynamic update being received from the second device when one of the registered one or more callbacks is triggered based on the change in the execution status of the second technical computing device; and
receive information regarding the change in the execution status of the second technical computing device based on the received dynamic update; and
obtain the generated result of the task,
the generated result being:
received by the first device from the second device, and transmitted, by the first device and based on receiving the generated result from the second device, to the first technical computing device.

10. The first technical computing device of claim 9, where the processor, when obtaining the generated result of the task, is further to:
receive a notification from the first device that the job, associated with the task, is complete; and
obtain the generated result of the task from the first device after receiving the notification from the first device.

11. The first technical computing device of claim 10, where the processor, when receiving the notification, is further to:
receive the notification from the first device using a registered callback of the one or more registered callbacks.

12. The first technical computing device of claim 9, where the processor, when submitting the task to the first device, is further to:
submit the job to the first device,
the job being associated with the task and one or more other tasks.

13. A first device comprising:
a memory to store instructions; and
a processor to execute the instructions to:
receive a task, associated with a job, for execution, the execution occurring in a technical computing environment, the task being received from a first technical computing device;
submit the task to a second device,
the task causing the second device to:
make the task available;
register the task with a second technical computing device, the second technical computing device generating a result based on the second technical computing device performing an operation associated with the task;
receive a request to register a callback, associated with the task, with the first technical computing device, the request being received from the first technical computing device, the callback being to:
dynamically update the first technical computing device when an execution status of the second technical computing device changes, the execution status being associated with the operation associated with the task;
transmit, based on receiving the request to register the callback, a request to the second device to receive a notification of the generated result of the task,
the transmitted request causing the second device to:
register the notification with the second technical computing device;
transmit the notification of the generated result of the task to the first technical computing device,
transmit, based on the task, a dynamic update,
the dynamic update being received from the second device when the registered callback is triggered based on the change in the execution status of the second technical computing device;
obtain the generated result of the task,
the generated result being received from the second device; and
transmit, based on receiving the generated result from the second device,
the generated result to the first technical computing device.

14. The first device of claim 13, where the processor, when transmitting the generated result, is further to:
transmit a notification that the job, associated with the task, is complete.

15. The first device of claim 14, where the processor, when transmitting the notification that the job is complete, is further to:
transmit the notification that the job is complete using the callback.

16. The first device of claim 13, where the processor, when receiving the task, is further to:
receive the job,
the job being associated with the task and one or more other tasks.

17. A non-transitory computer readable medium storing instructions, the instructions comprising:
one or more instructions which, when executed by a processor of a first technical computing device, cause the processor to:
submit a task, associated with a job, to a first device, the task causing the first device to submit the task to a second device to cause the second device to:
make the task available; and
register the task with a second technical computing device, the second technical computing device generating a result based on the second technical computing device performing an operation associated with the task;
register one or more callbacks, associated with the task, with the first device, the one or more callbacks being to:
dynamically update the first technical computing device when an execution status of the second technical computing device changes, the execution status being associated with the operation associated with the task, and the one or more instructions to register the one or more callbacks with the first device being to:
cause the first device to:
transmit a request to the second device to receive a notification of the generated result of the task; and
transmit the notification of the generated result of the task to the first technical computing device; and cause the second device to:
register, based on the transmitted request, the notification with the second technical computing device;
receive, based on the task, a dynamic update, the dynamic update being received from the second device when one of the registered one or more callbacks is triggered based on the change in the execution status of the second technical computing device; and
receive information regarding the change in the execution status of the second technical computing device based on the received dynamic update; and
obtain the generated result of the task, the generated result being:
received by the first device from the second device, and
transmitted, by the first device and based on receiving the generated result from the second device, to the first technical computing device.

18. The non-transitory computer readable medium of claim 17, where the one or more instructions to obtain the generated result of the task include:
one or more instructions to receive a notification from the first device that the job, associated with the task, is complete; and
one or more instructions to obtain the generated result of the task from the first device after receiving the notification that the job is complete from the first device.

19. The non-transitory computer readable medium of claim 18, where the one or more instructions to receive the notification include:
one or more instructions to receive the notification that the job is complete from the first device using a registered callback of the one or more registered callbacks.

20. The non-transitory computer readable medium of claim 17, where the one or more instructions to submit the task to the first device include:
one or more instructions to submit the job to the first device,
the job being associated with the task and one or more other tasks.

21. A non-transitory computer readable medium storing instructions, the instructions comprising:
one or more instructions which, when executed by a processor of a first device, cause the processor to:
receive a task, associated with a job, for execution, the execution occurring in a technical computing environment, the task being received from a first technical computing device;
submit the task to a second device, the task causing the second device to:
make the task available;
register the task with a second technical computing device, the second technical computing device generating a result based on the second technical computing device performing an operation associated with the task;
receive a request to register a callback, associated with the task, with the first technical computing device, the request being received from the first technical computing device, the callback being to:
dynamically update the first technical computing device when an execution status of the second technical computing device changes, the execution status being associated with the operation associated with the task;
transmit, based on receiving the request to register the callback, a request to the second device to receive a notification of the generated result of the task,
the transmitted request causing the second device to:
register the notification with the second technical computing device;
transmit the notification of the generated result of the task to the first technical computing device, transmit, based on the task, a dynamic update, the dynamic update being received from the second device when the registered callback is triggered based on the change in the execution status of the second technical computing device;
obtain the generated result of the task, the generated result being received from the second device; and
transmit, based on receiving the generated result from the second device, the generated result to the first technical computing device.

22. The non-transitory computer readable medium of claim 21, where the one or more instructions to transmit the generated result include:
one or more instructions to transmit a notification that the job, associated with the task, is complete.

23. The non-transitory computer readable medium of claim 22, where the one or more instructions to transmit the notification that the job is complete include:
one or more instructions to transmit the notification that the job is complete using the callback.

24. The non-transitory computer readable medium of claim 21, where the one or more instructions to receive the task include:
one or more instructions to receive the job,
the job being associated with the task and one or more other tasks.

* * * * *